US012082161B2

United States Patent
Wu et al.

(10) Patent No.: US 12,082,161 B2
(45) Date of Patent: *Sep. 3, 2024

(54) METHOD AND DEVICE IN UE AND BASE STATION USED FOR WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,502

(22) Filed: Oct. 9, 2022

(65) Prior Publication Data
US 2023/0039484 A1   Feb. 9, 2023

Related U.S. Application Data

(63) Continuation of application No. 17/111,520, filed on Dec. 4, 2020, now Pat. No. 11,510,180, which is a
(Continued)

(30) Foreign Application Priority Data

Jul. 13, 2018   (CN) .......................... 201810770266.2

(51) Int. Cl.
*H04W 72/02*   (2009.01)
*H04L 5/00*   (2006.01)
(Continued)

(52) U.S. Cl.
CPC ........... *H04W 72/02* (2013.01); *H04L 5/0023* (2013.01); *H04L 5/0051* (2013.01); *H04W 24/10* (2013.01);
(Continued)

(58) Field of Classification Search
CPC ... H04L 5/0023; H04L 5/0048; H04L 5/0094; H04W 24/10; H04W 36/0058;
(Continued)

(56) References Cited

U.S. PATENT DOCUMENTS

2012/0069833 A1   3/2012   Molnar
2012/0140660 A1   6/2012   Kang et al.
(Continued)

FOREIGN PATENT DOCUMENTS

CN   101690359 A   3/2010
CN   102781098 A   11/2012
(Continued)

OTHER PUBLICATIONS

ESTI TR125.996 V11.0.0 Universal Mobile Telecommunications System(UMTS);Spatial channel model for Multiple Input Multiple Output(MIMO)simulation Sep. 30, 2012.
(Continued)

*Primary Examiner* — Pao Sinkantarakorn

(57) ABSTRACT

The present disclosure discloses a method and device in UE and base station used for wireless communications. A UE transmits a first radio signal, the first radio signal indicating a first reference signal out of M reference signals; and monitors a first signaling in each of W time-frequency resource block(s). Herein, at least one reference signal of the M reference signals is transmitted by a first serving cell, and the first serving cell is not added by the UE; the UE assumes that a transmission antenna port of the first signaling is Quasi-Co-Located with a transmission antenna port of the
(Continued)

first reference signal; W is a positive integer, and M is a positive integer greater than 1. Such method can be employed to avoid delay and service interruption brought about by cell handover.

20 Claims, 22 Drawing Sheets

Related U.S. Application Data continuation of application No. PCT/CN2019/094667, filed on Jul. 4, 2019.

(51) Int. Cl.
  *H04W 24/10* (2009.01)
  *H04W 72/0446* (2023.01)
  *H04W 72/0453* (2023.01)
  *H04W 72/53* (2023.01)
  *H04W 92/10* (2009.01)

(52) U.S. Cl.
  CPC ... *H04W 72/0446* (2013.01); *H04W 72/0453* (2013.01); *H04W 72/53* (2023.01); *H04W 92/10* (2013.01)

(58) Field of Classification Search
  CPC ......... H04W 36/0066; H04W 36/0094; H04W 72/02; H04W 72/0406; H04W 72/042; H04W 72/0446; H04W 72/0453; H04W 72/0493
  See application file for complete search history.

(56) References Cited

U.S. PATENT DOCUMENTS

| | | | |
|---|---|---|---|
| 2014/0301301 A1 | 10/2014 | Cheng | |
| 2019/0045488 A1* | 2/2019 | Park | H04L 5/0048 |
| 2019/0052339 A1 | 2/2019 | Zhou et al. | |
| 2019/0215870 A1* | 7/2019 | Babaei | H04W 72/23 |
| 2019/0229879 A1 | 7/2019 | Yi et al. | |
| 2019/0253986 A1 | 8/2019 | Jeon et al. | |
| 2020/0274606 A1 | 8/2020 | Kang et al. | |
| 2020/0344834 A1* | 10/2020 | Harada | H04B 7/0695 |

FOREIGN PATENT DOCUMENTS

| | | |
|---|---|---|
| CN | 103688586 A | 3/2014 |
| CN | 104168618 A | 11/2014 |
| CN | 106685498 A | 5/2017 |
| CN | 106686647 A | 5/2017 |
| CN | 107343297 A | 11/2017 |
| CN | 107645324 A | 1/2018 |
| CN | 107888266 A | 4/2018 |
| CN | 108092754 A | 5/2018 |
| CN | 108124270 A | 6/2018 |
| IN | 106572495 A | 4/2017 |
| WO | 2013138996 A1 | 9/2013 |
| WO | 2015165052 A1 | 11/2015 |

OTHER PUBLICATIONS

CN201810770266.2 Notification to Grant Patent Right for Invention dated Jun. 2, 2020.
CN201810770266.2 1st Office Action dated May 9, 2020.
CN201810770266.2 First Search Report dated May 4, 2020.
ISR received in application No. PCT/CN2019/094667 dated Sep. 27, 2019.
The extended European search report in application 19833047.4 dated Aug. 13, 2021.
The United States search report in U.S. Appl. No. 17/111,520, dated Mar. 25, 2022.

* cited by examiner

| Second information | Index of first serving cell | Index(es) of M2 reference signal(s) | ... |

FIG. 13

Third parameter ⟶ First signaling

FIG. 17

METHOD AND DEVICE IN UE AND BASE STATION USED FOR WIRELESS COMMUNICATION

CROSS REFERENCE TO RELATED APPLICATIONS

This application is a continuation of the U.S. patent application Ser. No. 17/111,520, filed on Dec. 4, 2020, which is a continuation of International Application No. PCT/CN2019/094667, filed Jul. 4, 2019, claims the priority benefit of Chinese Patent Application No. 201810770266.2, filed on Jul. 13, 2018, the full disclosure of which is incorporated herein by reference.

BACKGROUND

Technical Field

The present disclosure relates to methods and devices in wireless communication systems, and in particular to a method and device in a wireless communication system supporting multiple antennas.

Related Art

In LTE system, cell handover is controlled by a base station based on measurements of a User Equipment (UE). The mechanism in LTE is generally maintained in the cell handover of 3rd Generation Partner Project (3GPP) Release 15 (R15). However, more application scenarios need to be supported in New Radio (NR) system, including some related to Ultra-Reliable and Low Latency Communications (URLLC), which are much more demanding on latency and more challenging to the implementation of cell handover.

Massive Multiple Input Multiple Output (MIMO) is an important technical feature of NR system. In Massive MIMO, multiple antennas form through beamforming a narrow beam pointing in a specific direction to improve communication quality. Since a beam formed by beamforming of multiple antennas is usually narrow, beams from both sides of communications ought to be aligned with each other for an effective communication.

SUMMARY

Inventors find through researches that beam-based communications will have negative impact on cell handover, such as extra delay and ping-pong effect. How to reduce such impacts, and in the meantime further improve performance of peripheral users at the boundary of a cell to meet requirements of various application scenarios remain a problem to be solved.

To address the above problem, the present disclosure provides a solution. It should be noted that embodiments of the UE in the present disclosure and the characteristics of the embodiments can be applied to the base station in the present disclosure when there is no conflict, and vice versa, what's more, the embodiments of the present disclosure and the characteristics in the embodiments may be mutually combined if no conflict is incurred.

The present disclosure provides a method in a User Equipment (UE) for wireless communications, comprising:
transmitting a first radio signal, the first radio signal indicating a first reference signal out of M reference signals; and
monitoring a first signaling in each time-frequency resource block of W time-frequency resource block(s);
herein, at least one reference signal of the M reference signals is transmitted by a first serving cell, and the first serving cell is not added by the UE; the UE assumes that a transmission antenna port of the first signaling is Quasi-Co-Located (QCL) with a transmission antenna port of the first reference signal; W is a positive integer, and M is a positive integer greater than 1.

In one embodiment, a problem in need of solving in the present disclosure is how to reduce latency and avoid service interruption arising from cell handover. The above method enables a UE to measure reference signals from a local cell and from a neighboring one at the same time and then, according to the UE's feedback, allows either the local cell or the neighboring one to send data to the UE in a transparent manner, hence a solution to the problem.

In one embodiment, the above method is characterized in that the first reference signal of the M reference signals is of a best reception quality and the first signaling is transmitted by a transmitted of the first reference signal, so that the first signaling's transmission quality can be guaranteed.

In one embodiment, the above method is characterized in that whoever sends the first signaling, the UE will monitor the first signaling in the same way on the W time-frequency resource blocks, namely, changes in a transmitter of the first signaling is transparent to the UE, to the benefit of reducing implementation complexity, so that delay and potential service interruption resulting from cell handover can be avoided while achieving performance improvement.

According to one aspect of the present disclosure, comprising:
receiving M configuration information blocks via an air interface;
herein, the M configuration information blocks respectively indicate the M reference signals; at least one reference signal of the M reference signals is transmitted by a second serving cell, and the second serving cell is added by the UE; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the index of the first serving cell and the index of the second serving cell are respectively composed of Q1 bits and Q2 bits, Q1 and Q2 being different positive integers.

According to one aspect of the present disclosure, comprising:
receiving the M reference signals;
herein, measurements on the M reference signals are used to determine the first reference signal.

According to one aspect of the present disclosure, comprising:
receiving N reference signal(s);
herein, measurement(s) on the N reference signal(s) is(are) used to trigger a transmission of the first radio signal; N being a positive integer.

According to one aspect of the present disclosure, comprising:
receiving first information on a target serving cell;
herein, the first information indicates a first time-frequency resource pool, the first time-frequency resource pool comprising a positive integer number of time-frequency resource block(s), the W time-frequency resource block(s) belongs(belong) to a section of the first time-frequency resource pool that is located in a first time window, and the target serving cell is added by the UE.

According to one aspect of the present disclosure, comprising:
receiving second information on the first serving cell;
herein, the second information indicates M2 reference signal(s) of the M reference signals and an index of the first serving cell, M2 being a positive integer less than M.

According to one aspect of the present disclosure, comprising:
receiving a second radio signal;
herein, the UE successfully receives the first signaling in at least one time-frequency resource block of the W time-frequency resource block(s); the first signaling comprises scheduling information of the second radio signal; the second radio signal carries a first data block, the first data block being one of K data blocks; K is a positive integer.

According to one aspect of the present disclosure, comprising:
transmitting uplink information; and
herein, the uplink information is used to determine whether each of the K data blocks is correctly received.

According to one aspect of the present disclosure, comprising:
receiving third information;
herein, the third information indicates K.

In one embodiment, the above method is advantageous in that a serving cell of the UE notifies the UE of a total number of data blocks required to be received in advance, so that as soon as the UE receives all requested data blocks sent from a same cell or different cells, it is able to tell the serving cell not to continue sending the rest of the K data blocks yet to be sent.

According to one aspect of the present disclosure, comprising:
receiving a third radio signal;
herein, the third radio signal carries a second data block, the second data block being one of the K data blocks.

The present disclosure provides a method in a first base station for wireless communications, comprising:
receiving a first radio signal, the first radio signal indicating a first reference signal out of M reference signals; and
transmitting a first signaling in at least one time-frequency resource block of W time-frequency resource block(s), herein, the first reference signal is transmitted by a serving cell maintained by the first base station; or, transmitting the first signaling in the W time-frequency resource block(s), herein, the first reference signal is not transmitted by any serving cell maintained by the first base station;
herein, at least one reference signal of the M reference signals is transmitted by a first serving cell, the first serving cell not being added by a transmitter of the first radio signal; at least one serving cell maintained by the first base station is added by a transmitter of the first radio signal; the transmitter of the first radio signal assumes that a transmission antenna port of the first signaling is Quasi-Co-Located (QCL) with a transmission antenna port of the first reference signal; W is a positive integer, and M is a positive integer greater than 1.

According to one aspect of the present disclosure, comprising:
transmitting M configuration information blocks via an air interface;
herein, the M configuration information blocks respectively indicate the M reference signals; at least one reference signal of the M reference signals is transmitted by a second serving cell, and the second serving cell is added by the transmitter of the first radio signal, the first base station being a maintenance base station for the second serving cell; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the index of the first serving cell and the index of the second serving cell are respectively composed of Q1 bits and Q2 bits, Q1 and Q2 being different positive integers.

According to one aspect of the present disclosure, comprising:
transmitting M1 reference signal(s) of the M reference signals;
herein, measurement(s) on the M1 reference signal(s) is(are) used to determine the first reference signal, M1 being a positive integer less than M.

According to one aspect of the present disclosure, comprising:
transmitting N reference signal(s);
herein, measurement(s) on the N reference signal(s) is(are) used to trigger a transmission of the first radio signal, N being a positive integer.

According to one aspect of the present disclosure, comprising:
transmitting first information on a target serving cell;
herein, the first information indicates a first time-frequency resource pool, the first time-frequency resource pool comprising a positive integer number of time-frequency resource block(s), the W time-frequency resource block(s) belongs(belong) to a section of the first time-frequency resource pool that is located in a first time window, and the target serving cell is added by the transmitter of the first radio signal.

According to one aspect of the present disclosure, comprising:
receiving uplink information;
herein, the first signaling comprises scheduling information of a second radio signal, and the second radio signal carries a first data block, the first data block being one of K data blocks; the uplink information is used to determine whether each of the K data blocks is correctly received.

According to one aspect of the present disclosure, comprising:
transmitting third information;
herein, the third information indicates K.

According to one aspect of the present disclosure, comprising:
transmitting a second radio signal;
herein, the first base station transmits the first signaling in at least one time-frequency resource block of the W time-frequency resource block(s), the first signaling comprises scheduling information of the second radio signal, and the second radio signal carries a first data block, the first data block being one of K data blocks; K being a positive integer.

According to one aspect of the present disclosure, comprising:

transmitting a third radio signal;

herein, the third radio signal carries a second data block, the second data block being one of the K data blocks; a time resource occupied by the third radio signal is earlier than a time resource occupied by the second radio signal, and an index of the second data block among the K data blocks is smaller than an index of the first data block among the K data blocks.

According to one aspect of the present disclosure, comprising:

transmitting fourth information via a backhaul link;

herein, the fourth information indicates a first time-frequency resource pool, the first time-frequency resource pool comprising a positive integer number of time-frequency resource block(s), and the W time-frequency resource block(s) belongs(belong) to a section of the first time-frequency resource pool that is located in a first time window.

In one embodiment, the above method is advantageous in allowing the first serving cell to perform data transmission to the UE transparently, thus preventing latency and potential service interruption brought about by cell handover.

The present disclosure provides a method in a second base station for wireless communications, comprising:

receiving a first radio signal, the first radio signal indicating a first reference signal out of M reference signals; and transmitting a first signaling in at least one time-frequency resource block of W time-frequency resource block(s), wherein the first reference signal is transmitted by a serving cell maintained by the second base station; or, transmitting the first signaling in the W time-frequency resource block(s), wherein the first reference signal is not transmitted by any serving cell maintained by the second base station;

herein, the second base station is a maintenance base station for a first serving cell, at least one reference signal of the M reference signals is transmitted by the first serving cell, none of serving cells maintained by the second base station being added by a transmitter of the first radio signal; the transmitter of the first radio signal assumes that a transmission antenna port of the first signaling is Quasi-Co-Located (QCL) with a transmission antenna port of the first reference signal; W is a positive integer, and M is a positive integer greater than 1.

According to one aspect of the present disclosure, comprising:

transmitting M2 reference signal(s) of the M reference signals;

herein, measurement(s) on the M2 reference signal(s) is(are) used to determine the first reference signal, M2 being a positive integer less than M.

According to one aspect of the present disclosure, comprising:

transmitting second information on the first serving cell;

herein, the second information indicates M2 reference signal(s) of the M reference signals, M2 being a positive integer less than M.

According to one aspect of the present disclosure, comprising:

transmitting a second radio signal;

herein, the second base station transmits the first signaling in at least one time-frequency resource block of the W time-frequency resource block(s), the first signaling comprises scheduling information of the second radio signal, and the second radio signal carries a first data block, the first data block being one of K data blocks; K being a positive integer.

According to one aspect of the present disclosure, comprising:

transmitting a third radio signal;

herein, the third radio signal carries a second data block, the second data block being one of the K data blocks; a time resource occupied by the third radio signal is earlier than a time resource occupied by the second radio signal, and an index of the second data block among the K data blocks is larger than an index of the first data block among the K data blocks.

In one embodiment, the above method is characterized in that the first serving cell transmits the K data blocks in a different order from the second serving cell, so as to reduce the chance of the UE receiving the same data block(s) from different serving cells, thereby minimizing a total time length required for successfully receiving all of the K data blocks.

According to one aspect of the present disclosure, comprising:

receiving fourth information via a backhaul link;

herein, the fourth information indicates a first time-frequency resource pool, the first time-frequency resource pool comprising a positive integer number of time-frequency resource block(s), and the W time-frequency resource block(s) belongs(belong) to a section of the first time-frequency resource pool that is located in a first time window.

The present disclosure provides a UE for wireless communications, comprising:

a first transmitter, which transmits a first radio signal, the first radio signal indicating a first reference signal out of M reference signals; and a first receiver, which monitors a first signaling in each time-frequency resource block of W time-frequency resource block(s);

herein, at least one reference signal of the M reference signals is transmitted by a first serving cell, and the first serving cell is not added by the UE; the UE assumes that a transmission antenna port of the first signaling is Quasi-Co-Located (QCL) with a transmission antenna port of the first reference signal; W is a positive integer, and M is a positive integer greater than 1.

In one embodiment, the above UE for wireless communications is characterized in that the first receiver receives M configuration information blocks via an air interface; herein the M configuration information blocks respectively indicate the M reference signals; at least one reference signal of the M reference signals is transmitted by a second serving cell, and the second serving cell is added by the UE; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the index of the first serving cell and the index of the second serving cell are respectively composed of Q1 bits and Q2 bits, Q1 and Q2 being different positive integers.

In one embodiment, the above UE for wireless communications is characterized in that the first receiver receives the M reference signals; herein, measurements on the M reference signals are used to determine the first reference signal.

In one embodiment, the above UE for wireless communications is characterized in that the first receiver receives N reference signal(s); herein, measurement(s) on the N reference signal(s) is(are) used to trigger a transmission of the first radio signal; N is a positive integer.

In one embodiment, the above UE for wireless communications is characterized in that the first receiver receives first information on a target serving cell; herein, the first information indicates a first time-frequency resource pool, the first time-frequency resource pool comprising a positive integer number of time-frequency resource block(s), the W time-frequency resource block(s) belongs(belong) to a section of the first time-frequency resource pool that is located in a first time window, and the target serving cell is added by the UE.

In one embodiment, the above UE for wireless communications is characterized in that the first receiver receives second information on the first serving cell; herein, the second information indicates M2 reference signal(s) of the M reference signals and an index of the first serving cell, M2 being a positive integer less than M.

In one embodiment, the above UE for wireless communications is characterized in that the first receiver receives a second radio signal; herein, the first signaling comprises scheduling information of the second radio signal; the second radio signal carries a first data block, the first data block being one of K data blocks; K is a positive integer.

In one embodiment, the above UE for wireless communications is characterized in that the first transmitter transmits uplink information; herein, the uplink information is used to determine whether each of the K data blocks is correctly received.

In one embodiment, the above UE for wireless communications is characterized in that the first receiver receives third information; herein, the third information indicates K.

In one embodiment, the above UE for wireless communications is characterized in that the first receiver receives a third radio signal; herein, the third radio signal carries a second data block, the second data block being one of the K data blocks.

The present disclosure provides a first base station for wireless communications, comprising:
 a second receiver, which receives a first radio signal, the first radio signal indicating a first reference signal out of M reference signals; and
 a second transmitter, which transmits a first signaling in at least one time-frequency resource block of W time-frequency resource block(s), wherein the first reference signal is transmitted by a serving cell maintained by the first base station; or, which drops transmitting the first signaling in the W time-frequency resource block(s), wherein the first reference signal is not transmitted by any serving cell maintained by the first base station;
 herein, at least one reference signal of the M reference signals is transmitted by a first serving cell, the first serving cell not being added by a transmitter of the first radio signal; at least one serving cell maintained by the first base station is added by a transmitter of the first radio signal; the transmitter of the first radio signal assumes that a transmission antenna port of the first signaling is Quasi-Co-Located (QCL) with a transmission antenna port of the first reference signal; W is a positive integer, and M is a positive integer greater than 1.

In one embodiment, the above first base station for wireless communications is characterized in that the second transmitter transmits M configuration information blocks via an air interface; herein the M configuration information blocks respectively indicate the M reference signals; at least one reference signal of the M reference signals is transmitted by a second serving cell, and the second serving cell is added by the transmitter of the first radio signal, the first base station being a maintenance base station for the second serving cell; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the index of the first serving cell and the index of the second serving cell are respectively composed of Q1 bits and Q2 bits, Q1 and Q2 being different positive integers.

In one embodiment, the above first base station for wireless communications is characterized in that the second transmitter transmits M1 reference signal(s) of the M reference signals; herein, measurement(s) on the M1 reference signal(s) is(are) used to determine the first reference signal, M1 being a positive integer less than M.

In one embodiment, the above first base station for wireless communications is characterized in that the second transmitter transmits N reference signal(s); herein, measurement(s) on the N reference signal(s) is(are) used to trigger a transmission of the first radio signal; N being a positive integer.

In one embodiment, the above first base station for wireless communications is characterized in that the second transmitter transmits first information on a target serving cell; herein, the first information indicates a first time-frequency resource pool, the first time-frequency resource pool comprising a positive integer number of time-frequency resource block(s), the W time-frequency resource block(s) belongs(belong) to a section of the first time-frequency resource pool that is located in a first time window, and the target serving cell is added by the transmitter of the first radio signal.

In one embodiment, the above first base station for wireless communications is characterized in that the second receiver receives uplink information; herein, the first signaling comprises scheduling information of a second radio signal, and the second radio signal carries a first data block, the first data block being one of K data blocks; the uplink information is used to determine whether each of the K data blocks is correctly received.

In one embodiment, the above first base station for wireless communications is characterized in that the second transmitter transmits third information; herein, the third information indicates K.

In one embodiment, the above first base station for wireless communications is characterized in that the second transmitter transmits a second radio signal; herein, the first base station transmits the first signaling in at least one time-frequency resource block of the W time-frequency resource block(s), the first signaling comprises scheduling information of the second radio signal, and the second radio signal carries a first data block, the first data block being one of K data blocks; K being a positive integer.

In one embodiment, the above first base station for wireless communications is characterized in that the second transmitter transmits a third radio signal; herein, the third radio signal carries a second data block, the second data block being one of the K data blocks; a time resource occupied by the third radio signal is earlier than a time resource occupied by the second radio signal, and an index of the second data block among the K data blocks is smaller than an index of the first data block among the K data blocks.

In one embodiment, the above first base station for wireless communications is characterized in that the second transmitter transmit fourth information via a backhaul link; herein, the fourth information indicates a first time-frequency resource pool, the first time-frequency resource pool comprising a positive integer number of time-frequency resource block(s), and the W time-frequency resource block(s) belongs(belong) to a section of the first time-frequency resource pool that is located in a first time window.

The present disclosure provides a second base station for wireless communications, comprising:
- a third receiver, which receives a first radio signal, the first radio signal indicating a first reference signal out of M reference signals; and
- a third transmitter, which transmits a first signaling in at least one time-frequency resource block of W time-frequency resource block(s), wherein the first reference signal is transmitted by a serving cell maintained by the second base station; or, which drops transmitting the first signaling in the W time-frequency resource block(s), wherein the first reference signal is not transmitted by any serving cell maintained by the second base station;

herein, the second base station is a maintenance base station for a first serving cell, at least one reference signal of the M reference signals is transmitted by the first serving cell, none of serving cells maintained by the second base station being added by a transmitter of the first radio signal; the transmitter of the first radio signal assumes that a transmission antenna port of the first signaling is Quasi-Co-Located (QCL) with a transmission antenna port of the first reference signal; W is a positive integer, and M is a positive integer greater than 1.

In one embodiment, the above second base station for wireless communications is characterized in that the third transmitter transmits M2 reference signal(s) of the M reference signals; herein, measurement(s) on the M2 reference signal(s) is(are) used to determine the first reference signal, M2 being a positive integer less than M.

In one embodiment, the above second base station for wireless communications is characterized in that the third transmitter transmits second information on the first serving cell; herein, the second information indicates M2 reference signal(s) of the M reference signals, M2 being a positive integer less than M.

In one embodiment, the above second base station for wireless communications is characterized in that the third transmitter transmits a second radio signal; herein, the second base station transmits the first signaling in at least one time-frequency resource block of the W time-frequency resource block(s), the first signaling comprises scheduling information of the second radio signal, and the second radio signal carries a first data block, the first data block being one of K data blocks; K being a positive integer.

In one embodiment, the above second base station for wireless communications is characterized in that the third transmitter transmits a third radio signal; herein, the third radio signal carries a second data block, the second data block being one of the K data blocks; a time resource occupied by the third radio signal is earlier than a time resource occupied by the second radio signal, and an index of the second data block among the K data blocks is larger than an index of the first data block among the K data blocks.

In one embodiment, the above second base station for wireless communications is characterized in that the third receiver receives fourth information via a backhaul link; herein, the fourth information indicates a first time-frequency resource pool, the first time-frequency resource pool comprising a positive integer number of time-frequency resource block(s), and the W time-frequency resource block(s) belongs(belong) to a section of the first time-frequency resource pool that is located in a first time window.

In one embodiment, the present disclosure has the following advantages compared with prior art:

A UE is requested to measure reference signals from a local cell and a neighboring one simultaneously and feedback which reference signal is of optimal reception quality. Base stations for both cells decide in a clear and transparent way which serving cell is chosen for data transmission to the UE according to the feedback of the UE, thereby guaranteeing the data transmission quality, taking full advantage of cell handover and avoiding delay and potential service interruption that may accompany.

Whether data transmission is from a local cell or a neighboring one is transparent to the UE, thus reducing the complexity of UE implementation and streamlining the whole process.

A serving base station for the UE notifies the UE of a total number of data blocks required to be received in advance, so the UE is able to ask its serving cell not to send data blocks that have not yet sent immediately after successfully receiving all data blocks it needs from a same cell or different cells, hence avoidance of repetition and resource wastes incurred therefrom.

The local cell and an adjacent cell transmit data blocks in different orders so as to make it less possible for the UE to receive the same data block(s) from different serving cells, thus minimizing the time needed for successfully receiving all data blocks.

BRIEF DESCRIPTION OF THE DRAWINGS

Other features, objects and advantages of the present disclosure will become more apparent from the detailed description of non-restrictive embodiments taken in conjunction with the following drawings:

FIG. 13 illustrates a schematic diagram of second information according to one embodiment of the present disclosure.

FIG. 17 illustrates a schematic diagram of generating a first signaling according to one embodiment of the present disclosure.

DESCRIPTION OF THE EMBODIMENTS

Embodiment 1

Figure 1:
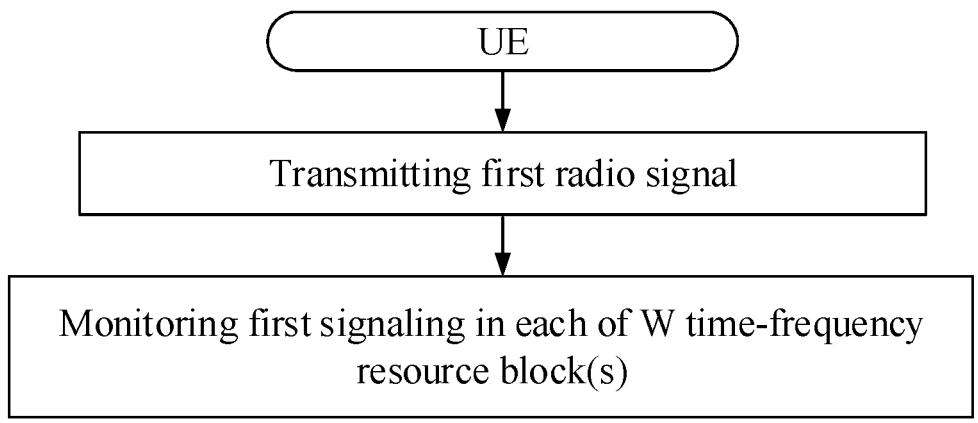
FIG. 1 illustrates a flowchart of a first radio signal and a first signaling according to one embodiment of the present disclosure.

Embodiment 1 illustrates a flowchart of a first radio signal and a first signaling; as shown in FIG. 1.

In Embodiment 1, the UE in the present disclosure transmits a first radio signal; and monitors a first signaling in each of W time-frequency resource block(s). Herein, the first radio signal indicates a first reference signal out of M reference signals; at least one reference signal of the M reference signals is transmitted by a first serving cell, and the first serving cell is not added by the UE; the UE assumes that a transmission antenna port of the first signaling is Quasi-Co-Located (QCL) with a transmission antenna port of the first reference signal; W is a positive integer, and M is a positive integer greater than 1.

In one embodiment, the first radio signal comprises a Random Access Channel (RACH) Preamble.

In one embodiment, the first radio signal is transmitted on a Physical Random Access CHannel (PRACH).

In one embodiment, a radio resource occupied by the first radio signal is related to the first reference signal.

In one embodiment, the radio resource comprises one or more of a time resource, a frequency resource or a code-domain resource.

In one embodiment, the code-domain resource comprises a RACH Preamble.

In one embodiment, the code-domain resource comprises a RACH Preamble sequence.

In one embodiment, the RACH Preamble of the first radio signal is related to the first reference signal.

In one embodiment, the RACH Preamble sequence of the first radio signal is related to the first reference signal.

In one embodiment, the first reference signal is used to determine a radio resource occupied by the first radio signal.

In one embodiment, an index of the first reference signal is used to determine a radio resource occupied by the first radio signal.

In one embodiment, an index of the first reference signal is an SSB-Index or an NZP-CSI-RS-ResourceId.

In one embodiment, the M reference signals comprise Channel-State Information Reference Signals (CSI-RS).

In one embodiment, the M reference signals comprise a Synchronization Signal/Physical Broadcast Channel block (SS/PBCH block).

In one embodiment, an index of any reference signal of the M reference signals is an SSB-Index or an NZP-CSI-RS-ResourceId.

In one embodiment, a radio resource occupied by the first radio signal is used to indicate the first reference signal out of the M reference signals.

In one embodiment, the first signaling is transmitted via an air interface.

In one embodiment, the first signaling is a physical-layer signaling.

In one embodiment, the first signaling is a dynamic signaling.

In one embodiment, the first signaling is a dynamic signaling used for DownLink Grant.

In one embodiment, the first signaling comprises Downlink Control Information (DCI).

In one embodiment, the first signaling comprises DownLink Grant DCI.

In one embodiment, the first signaling is UE specific.

In one embodiment, a signaling identifier of the first signaling is a Cell-Radio Network Temporary Identifier (C-RNTI).

In one embodiment, Cyclic Redundancy Check (CRC) of the first signaling is scrambled by a C-RNTI.

In one embodiment, the monitoring refers to blind receiving, which means receiving a signal and performing decoding, if the decoding turns out to be correct according to a CRC bit, it is then determined that the first signaling is successfully received; otherwise, it is determined that the first signaling fails to be received.

In one embodiment, the phrase that the first serving cell is not added by the UE includes the meaning that the UE does not perform SCell addition on the first serving cell.

In one embodiment, the phrase that the first serving cell is not added by the UE includes the meaning that an sCellToAddModList latest received by the UE does not include the first serving cell.

In one embodiment, the phrase that the first serving cell is not added by the UE includes the meaning that neither of an sCellToAddModList and an sCellToAddModListSCG latest received by the UE includes the first serving cell.

In one embodiment, the phrase that the first serving cell is not added by the UE includes the meaning that the UE is not assigned an SCellIndex for the first serving cell.

In one embodiment, the SCellIndex is a positive integer no greater than 31.

In one embodiment, the phrase that the first serving cell is not added by the UE includes the meaning that the UE is not assigned a ServCellIndex for the first serving cell.

In one embodiment, the ServCellIndex is a non-negative integer no greater than 31.

In one embodiment, the phrase that the first serving cell is not added by the UE includes the meaning that the first serving cell is not a Primary serving Cell (PCell) of the UE.

In one embodiment, the first radio signal is transmitted on a serving cell added by the UE.

In one embodiment, the word QCL, or Quasi Co-Located, is defined in details in 3GPP TS38.211, section 4.4, and 3GPP TS38.214, section 5.1.5.

In one embodiment, the UE assumes that an antenna port for transmitting DeModulation Reference Signals (DMRS) on a Physical Downlink Control CHannel (PDCCH) which the first signaling goes through is QCL with an antenna port transmitting the first reference signal.

In one embodiment, the UE assumes that at least one antenna port for transmitting the first signaling is QCL with at least one antenna port for transmitting the first reference signal.

In one embodiment, the UE assumes that at least one antenna port for transmitting the first signaling is QCL with any antenna port for transmitting the first reference signal.

In one embodiment, the UE assumes that any antenna port for transmitting the first signaling is QCL with any antenna port for transmitting the first reference signal.

Embodiment 2

Figure 2:
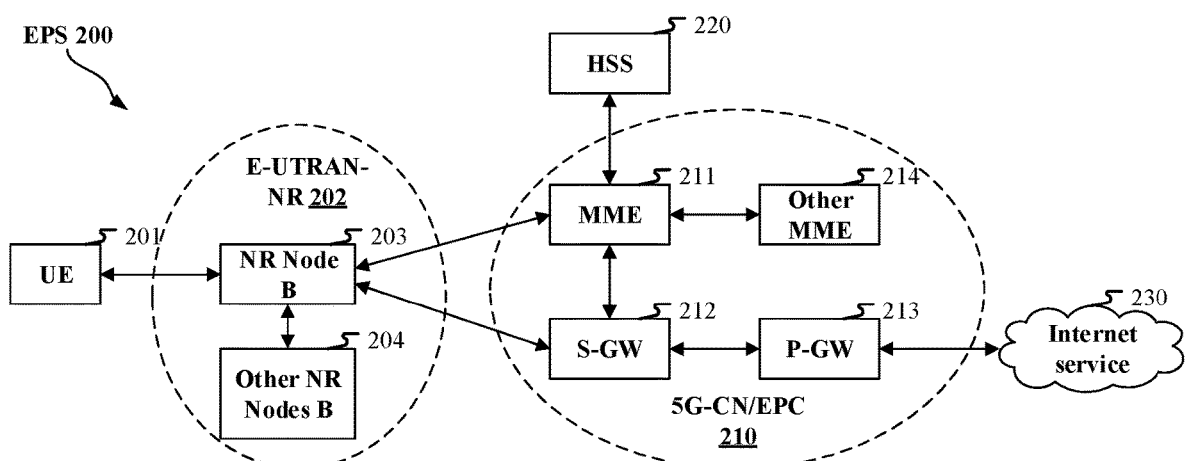
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE, LTE-A or future 5G system may be called an Evolved Packet System (EPS) 200. The EPS 200 may comprise one or more UEs 201, an E-UTRAN-NR 202, a 5G-CoreNetwork/Evolved Packet Core (5G-CN/EPC) 210, a Home Subscriber Server (HSS) 220 and an Internet Service 230. Herein, the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an evolved node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the EPC 210 via an S1 interface. The 5G-CN/EPC 210 comprises a Mobility Management Entity (MME) 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Services.

In one embodiment, the gNB 203 corresponds to the first base station in the present disclosure.

In one embodiment, the gNB 204 corresponds to the second base station in the present disclosure.

In one embodiment, the UE 201 corresponds to the UE in the present disclosure.

In one embodiment, the gNB 203 supports multi-antenna-based wireless communications.

In one embodiment, the gNB 204 supports multi-antenna-based wireless communications.

In one embodiment, the UE 201 is a terminal supporting multi-antenna-based wireless communications.

Embodiment 3

Figure 3:
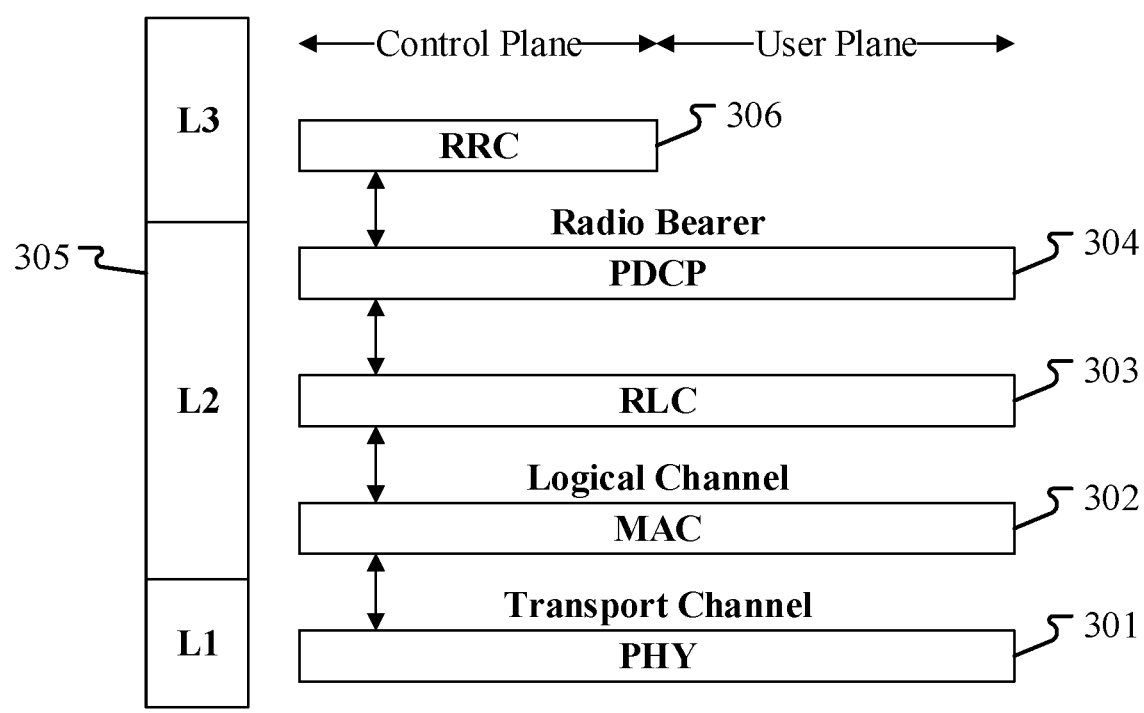
FIG. 3 illustrates a schematic diagram of an example of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the first base station in the present disclosure.

In one embodiment, the radio protocol architecture in FIG. 3 is applicable to the second base station in the present disclosure.

In one embodiment, the first radio signal in the present disclosure is generated by the PHY 301.

In one embodiment, the first signaling in the present disclosure is generated by the PHY 301.

In one embodiment, the first signaling in the present disclosure is generated by the MAC sublayer 302.

In one embodiment, the M configuration information blocks in the present disclosure are generated by the RRC sublayer 306.

In one embodiment, the M configuration information blocks in the present disclosure are generated by the MAC sublayer 302.

In one embodiment, the M reference signals in the present disclosure are generated by the PHY 301.

In one embodiment, each of the N reference signal(s) in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the PHY 301.

In one embodiment, the second radio signal in the present disclosure is generated by the PHY 301.

In one embodiment, the third radio signal in the present disclosure is generated by the PHY 301.

In one embodiment, the uplink information in the present disclosure is generated by the PDCP sublayer 304.

In one embodiment, the third information in the present disclosure is generated by the PDCP sublayer 304.

In one embodiment, the fourth information in the present disclosure is generated by the RRC sublayer 306.

Embodiment 4

Figure 4:
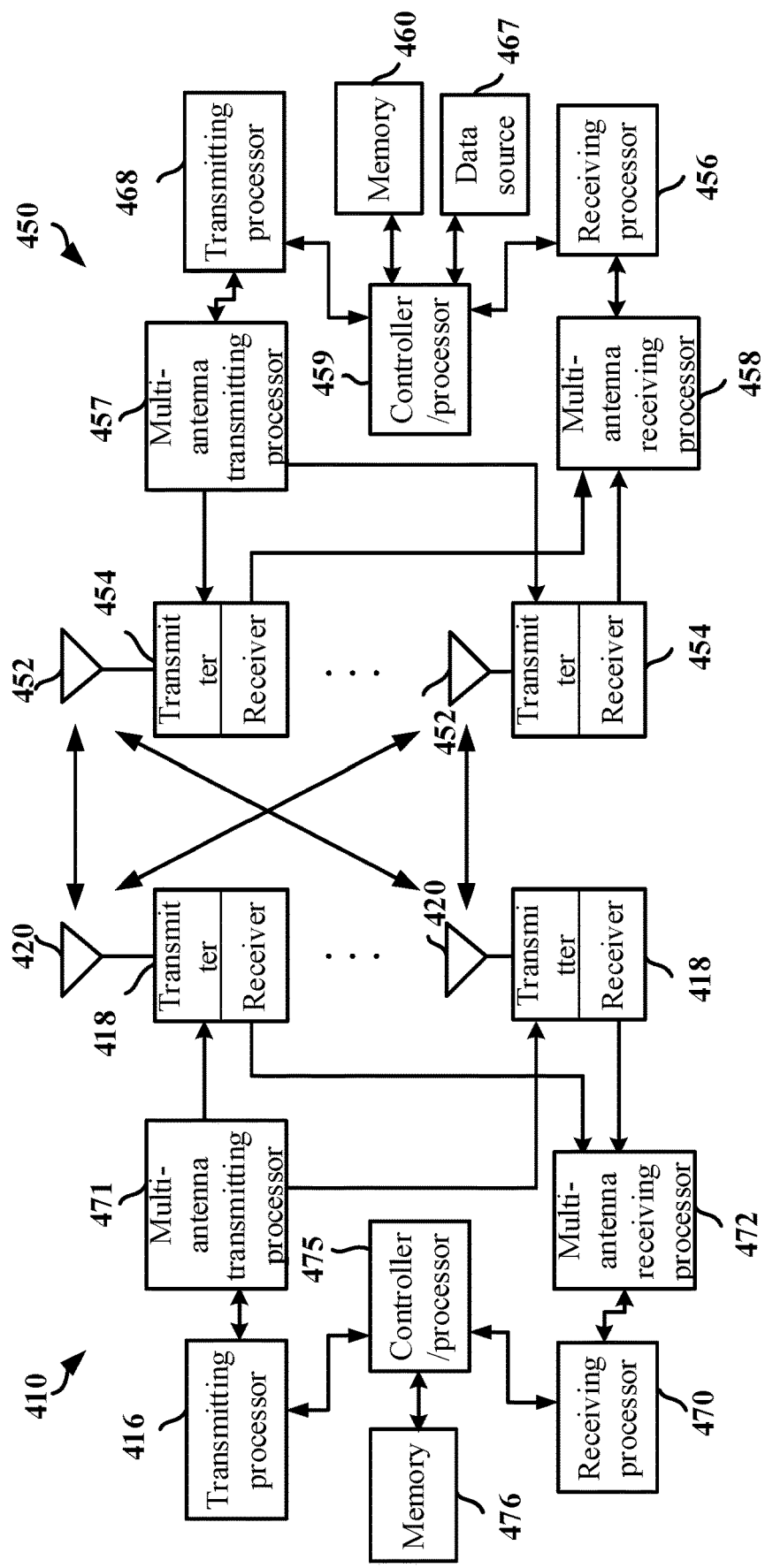
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides functions of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated onto the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are demultiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is used to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least transmits the first radio signal in the present disclosure, the first radio signal indicating the first reference signal out of the M reference signals in the present disclosure; and monitors the first signaling in the present disclosure in each time-frequency resource block of the W time-frequency resource block(s) in the present disclosure. Herein, at least one reference signal of the M reference signals is transmitted by a first serving cell, and the first serving cell is not added by the UE; the UE assumes that a transmission antenna port of the first signaling is Quasi-Co-Located (QCL) with a transmission antenna port of the first reference signal; W is a positive integer, and M is a positive integer greater than 1.

In one embodiment, the UE 450 comprises a memory that stores a computer readable instruction program. The computer readable instruction program generates an action when executed by at least one processor. The action includes: transmitting the first radio signal in the present disclosure, the first radio signal indicating the first reference signal out of the M reference signals in the present disclosure; and monitoring the first signaling in the present disclosure in each time-frequency resource block of the W time-frequency resource block(s) in the present disclosure. Herein, at least one reference signal of the M reference signals is transmitted by a first serving cell, and the first serving cell is not added by the UE; the UE assumes that a transmission antenna port of the first signaling is Quasi-Co-Located (QCL) with a transmission antenna port of the first reference signal; W is a positive integer, and M is a positive integer greater than 1.

In one embodiment, the gNB 410 comprises at least one processor and at least one memory. The at least one memory includes computer program codes. The at least one memory and the computer program codes are configured to be used in collaboration with the at least one processor. The gNB 410 at least receives the first radio signal in the present disclosure, the first radio signal indicating the first reference signal out of the M reference signals in the present disclosure; and transmits the first signaling in the present disclosure in at least one time-frequency resource block of the W time-frequency resource block(s), wherein the first reference signal is transmitted by a serving cell maintained by the gNB 410; or, drops transmitting the first signaling in the W time-frequency resource block(s), wherein the first reference signal is not transmitted by any serving cell maintained by the gNB 410. Herein, at least one reference signal of the M reference signals is transmitted by the first serving cell in the present disclosure, the first serving cell not being added by a transmitter of the first radio signal; at least one serving cell maintained by the gNB 410 is added by a transmitter of the first radio signal; the transmitter of the first radio signal assumes that an antenna port transmitting the first signaling and an antenna port transmitting the first reference signal are Quasi-Co-Located; W is a positive integer, and M is a positive integer greater than 1.

In one embodiment, the gNB 410 comprises a memory that stores a computer readable instruction program. The computer readable instruction program generates an action when executed by at least one processor. The action includes: receiving the first radio signal in the present disclosure, the first radio signal indicating the first reference signal out of the M reference signals in the present disclosure; and transmitting the first signaling in the present disclosure in at least one time-frequency resource block of the W time-frequency resource block(s), wherein the first reference signal is transmitted by a serving cell maintained by the gNB 410; or, dropping transmitting the first signaling in the W time-frequency resource block(s), wherein the first reference signal is not transmitted by any serving cell maintained by the gNB 410. Herein, at least one reference signal of the M reference signals is transmitted by the first serving cell in the present disclosure, the first serving cell not being added by a transmitter of the first radio signal; at least one serving cell maintained by the gNB 410 is added by a transmitter of the first radio signal; the transmitter of the first radio signal assumes that an antenna port transmitting the first signaling and an antenna port transmitting the first reference signal are Quasi-Co-Located; W is a positive integer, and M is a positive integer greater than 1.

In one embodiment, the gNB 410 comprises at least one processor and at least one memory. The at least one memory includes computer program codes. The at least one memory and the computer program codes are configured to be used in collaboration with the at least one processor. The gNB 410 at least receives the first radio signal in the present disclosure, the first radio signal indicating the first reference signal out of the M reference signals in the present disclosure; and transmits the first signaling in the present disclosure in at least one time-frequency resource block of the W time-frequency resource block(s), wherein the first reference signal is transmitted by a serving cell maintained by the gNB 410; or, drops transmitting the first signaling in the W time-frequency resource block(s), wherein the first reference signal is not transmitted by any serving cell maintained by the gNB 410. Herein, the gNB 410 is a maintenance base station for the first serving cell in the present disclosure, at least one of the M reference signals is transmitted by the first serving cell, and any serving cell maintained by the gNB 410 is not added by a transmitter of the first radio signal; the transmitter of the first radio signal assumes that an antenna port transmitting the first signaling and an antenna port transmitting the first reference signal are Quasi-Co-Located; W is a positive integer, and M is a positive integer greater than 1.

In one embodiment, the gNB 410 comprises a memory that stores a computer readable instruction program. The computer readable instruction program generates an action when executed by at least one processor. The action includes: receiving the first radio signal in the present disclosure, the first radio signal indicating the first reference signal out of the M reference signals in the present disclosure; and transmitting the first signaling in the present disclosure in at least one time-frequency resource block of the W time-frequency resource block(s), wherein the first reference signal is transmitted by a serving cell maintained by the gNB 410; or, dropping transmitting the first signaling in the W time-frequency resource block(s), wherein the first reference signal is not transmitted by any serving cell maintained by the gNB 410. Herein, the gNB 410 is a maintenance base station for the first serving cell in the present disclosure, at least one of the M reference signals is transmitted by the first serving cell, and any serving cell maintained by the gNB 410 is not added by a transmitter of the first radio signal; the transmitter of the first radio signal assumes that an antenna port transmitting the first signaling and an antenna port transmitting the first reference signal are Quasi-Co-Located; W is a positive integer, and M is a positive integer greater than 1.

In one embodiment, the gNB 410 corresponds to the first base station in the present disclosure.

In one embodiment, the gNB 410 corresponds to the second base station in the present disclosure.

In one embodiment, the UE 450 corresponds to the UE in the present disclosure.

In one embodiment, at least one of the antenna 420, the receiver 418, the receiving processor 470, the multi-antenna receiving processor 472, the controller/processor 475 or the memory 476 is used for receiving the first radio signal in the present disclosure; at least one of the antenna 452, the transmitter 454, the transmitting processor 468, the multi-antenna transmitting processor 457, the controller/processor 459, the memory 460 or the data source 467 is used for transmitting the first radio signal in the present disclosure.

In one embodiment, at least one of the antenna 452, the receiver 454, the receiving processor 456, the multi-antenna receiving processor 458, the controller/processor 459, the memory 460 or the data source 467 is used for monitoring the first signaling in the present disclosure in each of the W time-frequency resource block(s) in the present disclosure; at least one of the antenna 420, the transmitter 418, the transmitting processor 416, the multi-antenna transmitting processor 471, the controller/processor 475 or the memory 476 is used for transmitting the first signaling in the present disclosure in at least one of the W time-frequency resource block(s) in the present disclosure.

In one embodiment, at least one of the antenna 420, the transmitter 418, the transmitting processor 416, the multi-antenna transmitting processor 471, the controller/processor 475 or the memory 476 is used for determining whether to transmit the first signaling in the present disclosure in the W time-frequency resource block(s) in the present disclosure.

In one embodiment, at least one of the antenna 452, the receiver 454, the receiving processor 456, the multi-antenna receiving processor 458, the controller/processor 459, the memory 460 or the data source 467 is used for receiving the M configuration information blocks in the present disclosure via an air interface; at least one of the antenna 420, the transmitter 418, the transmitting processor 416, the multi-antenna transmitting processor 471, the controller/processor 475 or the memory 476 is used for transmitting the M configuration information blocks in the present disclosure via an air interface.

In one embodiment, at least one of the antenna 452, the receiver 454, the receiving processor 456, the multi-antenna receiving processor 458, the controller/processor 459, the memory 460 or the data source 467 is used for receiving the M reference signals in the present disclosure.

In one embodiment, at least one of the antenna 420, the transmitter 418, the transmitting processor 416, the multi-antenna transmitting processor 471, the controller/processor 475 or the memory 476 is used for transmitting the M1 reference signal(s) of the M reference signals in the present disclosure.

In one embodiment, at least one of the antenna 420, the transmitter 418, the transmitting processor 416, the multi-antenna transmitting processor 471, the controller/processor 475 or the memory 476 is used for transmitting the M2 reference signal(s) of the M reference signals in the present disclosure.

In one embodiment, at least one of the antenna 452, the receiver 454, the receiving processor 456, the multi-antenna receiving processor 458, the controller/processor 459, the memory 460 or the data source 467 is used for receiving the N reference signal(s) in the present disclosure; at least one of the antenna 420, the transmitter 418, the transmitting processor 416, the multi-antenna transmitting processor 471, the controller/processor 475 or the memory 476 is used for transmitting the N reference signal(s) in the present disclosure.

In one embodiment, at least one of the antenna 452, the receiver 454, the receiving processor 456, the multi-antenna receiving processor 458, the controller/processor 459, the memory 460 or the data source 467 is used for receiving the first information in the present disclosure on the target serving cell in the present disclosure; at least one of the antenna 420, the transmitter 418, the transmitting processor 416, the multi-antenna transmitting processor 471, the controller/processor 475 or the memory 476 is used for transmitting the first information in the present disclosure on the target serving cell in the present disclosure.

In one embodiment, at least one of the antenna 452, the receiver 454, the receiving processor 456, the multi-antenna receiving processor 458, the controller/processor 459, the memory 460 or the data source 467 is used for receiving the second information in the present disclosure on the first serving cell in the present disclosure; at least one of the antenna 420, the transmitter 418, the transmitting processor 416, the multi-antenna transmitting processor 471, the controller/processor 475 or the memory 476 is used for transmitting the second information in the present disclosure on the first serving cell in the present disclosure.

In one embodiment, at least one of the antenna 452, the receiver 454, the receiving processor 456, the multi-antenna receiving processor 458, the controller/processor 459, the memory 460 or the data source 467 is used for receiving the second radio signal in the present disclosure; at least one of the antenna 420, the transmitter 418, the transmitting processor 416, the multi-antenna transmitting processor 471, the controller/processor 475 or the memory 476 is used for transmitting the second radio signal in the present disclosure.

In one embodiment, at least one of the antenna 420, the receiver 418, the receiving processor 470, the multi-antenna receiving processor 472, the controller/processor 475 or the memory 476 is used for receiving the uplink information in the present disclosure; at least one of the antenna 452, the transmitter 454, the transmitting processor 468, the multi-antenna transmitting processor 457, the controller/processor 459, the memory 460 or the data source 467 is used for transmitting the uplink information in the present disclosure.

In one embodiment, at least one of the antenna 452, the receiver 454, the receiving processor 456, the multi-antenna receiving processor 458, the controller/processor 459, the memory 460 or the data source 467 is used for receiving the third information in the present disclosure; at least one of the antenna 420, the transmitter 418, the transmitting processor 416, the multi-antenna transmitting processor 471, the controller/processor 475 or the memory 476 is used for transmitting the third information in the present disclosure.

In one embodiment, at least one of the antenna 452, the receiver 454, the receiving processor 456, the multi-antenna receiving processor 458, the controller/processor 459, the memory 460 or the data source 467 is used for receiving the third radio signal in the present disclosure; at least one of the antenna 420, the transmitter 418, the transmitting processor 416, the multi-antenna transmitting processor 471, the controller/processor 475 or the memory 476 is used for transmitting the third radio signal in the present disclosure.

In one embodiment, at least one of the controller/processor 475 or the memory 476 is used for transmitting the fourth information in the present disclosure.

In one embodiment, at least one of the controller/processor 475 or the memory 476 is used for receiving the fourth information in the present disclosure.

Embodiment 5

Figure 5:
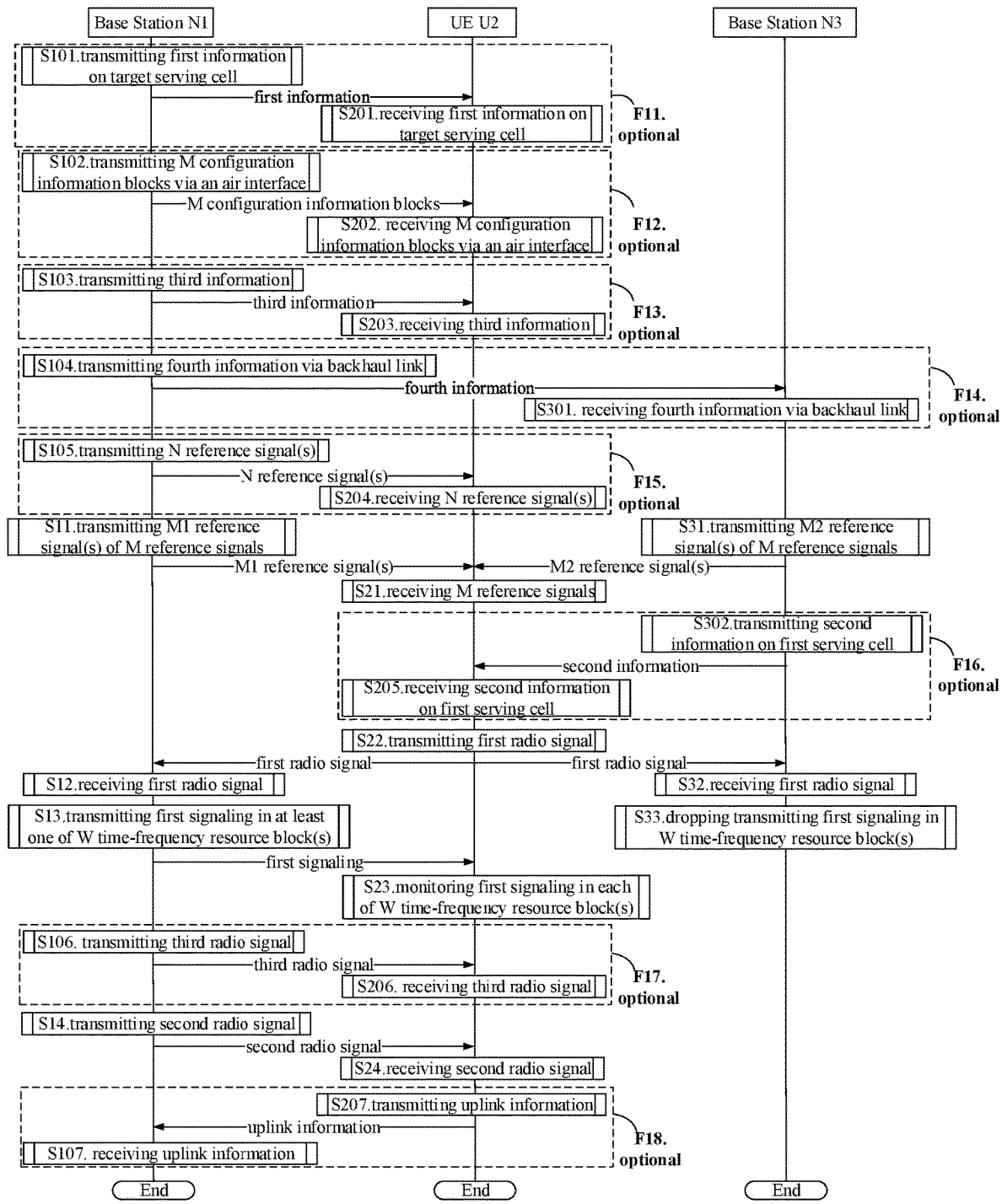
FIG. 5 illustrates a flowchart of a transmission according to one embodiment of the present disclosure.

Embodiment 5 illustrates a flowchart of a transmission, as shown in FIG. 5. In FIG. 5, a base station N1 is the first base station in the present disclosure, a base station N3 is the second base station in the present disclosure, and a UE U2 is the UE in the present disclosure. The base station N1 is a maintenance base station for a serving cell of the UE U2, and any serving cell maintained by the base station N3 is not added by the UE U2. In FIG. 5, steps respectively marked by boxes F11-F18 are optional.

The N1 transmits first information on a target serving cell in step S101; transmits M configuration information blocks via an air interface in step S102; transmits third information in step S103; and transmits fourth information via a backhaul link in step S104; transmits N reference signal(s) in step S105; transmits M1 reference signal(s) of M reference signals in step S11; receives a first radio signal in step S12; and transmits a first signaling in at least one of W time-frequency resource block(s) in step S13; transmits a third radio signal in step S106; transmits a second radio signal in step S14; and receives uplink information in step S107.

The U2 receives first information on a target serving cell in step S201; receives M configuration information blocks via an air interface in step S202; and receives third information in step S203; receives N reference signal(s) in step S204; receives M reference signals in step S21; and receives second information on a first serving cell in step S205; transmits a first radio signal in step S22; and monitors a first signaling in each of W time-frequency resource block(s) in step S23; receives a third radio signal in step S206; receives a second radio signal in step S24; and transmits uplink information in step S207.

The N3 receives fourth information via a backhaul link in step S301; transmits M2 reference signal(s) of M reference signals in step S31; and transmits second information on a first serving cell in step S302; receives a first radio signal in step S32; and drops transmitting a first signaling in W time-frequency resource block(s) in step S33.

In Embodiment 5, the first radio signal indicates a first reference signal out of the M reference signals, M being a positive integer greater than 1; the U2 assumes that an antenna port transmitting the first signaling and an antenna port transmitting the first reference signal are QCL. The M2 reference signal(s) of the M reference signals is(are) transmitted from a first serving cell, while the M1 reference signal(s) of the M reference signals is(are) transmitted from a second serving cell, M1 and M2 being positive integers less than the M. The N3 is a maintenance base station for the first serving cell, the first serving cell is not added by the U2, and any serving cell maintained by the N3 is not added by the U2. The N1 is a maintenance base station for the second serving cell, the second serving cell being added by the U2. The first reference signal is transmitted by a serving cell maintained by the N1, and the first reference signal is not transmitted by any serving cell maintained by the N3. The M configuration information blocks respectively indicate the M reference signals. Measurements on the M reference signals are used by the U2 for determining the first reference signal. Measurement(s) on the N reference signal(s) is(are) used to trigger transmission of the first radio signal; N is a positive integer. The target serving cell is added by the U2. The first information indicates a first time-frequency resource pool, the first time-frequency resource pool comprising a positive integer number of time-frequency resource block(s), the W time-frequency resource block(s) belongs(belong) to a section of the first time-frequency resource pool that is located in a first time window, W being a positive integer. The fourth information indicates the first time-frequency resource pool. The second information indicates the M2 reference signal(s) and an index of the first serving cell. The first signaling comprises scheduling information of the second radio signal; the second radio signal carries a first data block, the first data block being one of K data blocks; K is a positive integer. The third radio signal carries a second data block, the second data block being one of the K data blocks. The uplink information is used by the N1 for determining whether each of the K data blocks is correctly received. The third information indicates the K.

In one embodiment, the UE in the present disclosure receives the first signaling successfully in at least one of the W time-frequency resource blocks.

In one embodiment, the UE in the present disclosure receives the first signaling successfully in only one of the W time-frequency resource blocks.

In one embodiment, the UE in the present disclosure successfully receives the first signaling in a last time-frequency resource block of the W time-frequency resource blocks.

In one embodiment, the first serving cell is not maintained by the first base station in the present disclosure.

In one embodiment, when the first reference signal is transmitted by a serving cell maintained by the first base station in the present disclosure, the first base station transmits the first signaling in at least one of the W time-frequency resource block(s), otherwise, the first base station in the present disclosure drops transmitting the first signaling in the W time-frequency resource block(s).

In one embodiment, a transmitter of the first reference signal is used by the first base station in the present disclosure for determining whether the first base station transmits the first signaling in at least one of the W time-frequency resource block(s).

In one embodiment, the first base station in the present disclosure transmits a radio signal targeting a UE other than the UE in the present disclosure in the W time-frequency resource block(s).

In one embodiment, the second base station in the present disclosure transmits a radio signal targeting a UE other than the UE in the present disclosure in the W time-frequency resource block(s), the other UE adding at least one serving cell maintained by the second base station.

In one embodiment, if the first reference signal is not transmitted by any serving cell maintained by the second base station in the present disclosure, the second base station in the present disclosure drops transmitting the first signaling in the W time-frequency resource block(s).

In one embodiment, if the first reference signal is not transmitted by the first serving cell, the second base station in the present disclosure drops transmitting the first signaling in the W time-frequency resource block(s).

In one subembodiment, any of the M reference signals is not transmitted by any of serving cells other than the first serving cell maintained by the second base station in the present disclosure.

In one embodiment, the second base station in the present disclosure drops transmitting the first signaling in the W time-frequency resource block(s) and punctures in the W time-frequency resource block(s) in avoidance of interfering wireless transmission of another serving cell targeting the UE in the present disclosure.

In one embodiment, the second base station in the present disclosure drops transmitting the first signaling in the W time-frequency resource block(s) and buffers current data to be transmitted till next transmission opportunity.

In one embodiment, the second base station in the present disclosure drops transmitting the first signaling in the W time-frequency resource block(s) and discards current data to be transmitted.

In one embodiment, the first radio signal is transmitted on the second serving cell.

In one embodiment, the first radio signal is transmitted on a serving cell other than the second serving cell, the other serving cell being added by the UE in the present disclosure.

In one embodiment, any of the M reference signals is transmitted by either the first serving cell or the second serving cell.

In one embodiment, at least one of the M reference signals is transmitted by a serving cell other than the first serving cell and the second serving cell.

In one subembodiment, the other serving cell is added by the UE in the present disclosure.

In one subembodiment, the other serving cell is not added by the UE in the present disclosure.

In one embodiment, a sum of M1 and M2 is less than M.

In one embodiment, a sum of M1 and M2 is equal to M.

In one embodiment, none of the M reference signals belongs to the M1 reference signal(s) and the M2 reference signal(s) at the same time.

In one embodiment, the M2 reference signal(s) is(are) transmitted by the first serving cell.

In one embodiment, any of the M reference signals not belonging to the M2 reference signal(s) is not transmitted by the first serving cell.

In one embodiment, the first base station in the present disclosure transmits the M1 reference signal(s) on the second serving cell.

In one embodiment, the first base station in the present disclosure transmits at least one of the M reference signals other than the M1 reference signal(s) on a serving cell other than the second serving cell, the other serving cell being maintained by the first base station, and also being added by the UE in the present disclosure.

In one embodiment, any reference signal of the M reference signals other than the M1 reference signal(s) is not transmitted by the first base station in the present disclosure.

In one embodiment, the first base station in the present disclosure transmits the first signaling in at least one of the W time-frequency resource block(s), and the first base station in the present disclosure transmits the second radio signal.

In one embodiment, the second base station in the present disclosure transmits the M2 reference signal(s) on the first serving cell.

In one embodiment, the second base station in the present disclosure transmits at least one of the M reference signals other than the M2 reference signal(s) on a serving cell other than the first serving cell, the other serving cell being maintained by the second base station, and not being added by the UE in the present disclosure.

In one embodiment, any reference signal of the M reference signals other than the M2 reference signal(s) is not transmitted by the second base station in the present disclosure.

In one embodiment, of the M configuration information blocks each configuration information block corresponding to one of the M1 reference signal(s) comprises an index of the first serving cell; of the M configuration information blocks each configuration information block corresponding to one of the M2 reference signal(s) comprises an index of the second serving cell; the index of the first serving cell and the index of the second serving cell are respectively composed of Q1 bits and Q2 bits, Q1 and Q2 being different positive integers.

In one embodiment, the M configuration information blocks are transmitted by the second serving cell.

In one embodiment, the M configuration information blocks are transmitted by a serving cell other than the second serving cell, the other serving cell being added by the UE in the present disclosure.

In one subembodiment, a maintenance base station for the other serving cell is the first base station in the present disclosure.

In one embodiment, the M configuration information blocks are respectively carried by higher-layer signalings.

In one embodiment, the M configuration information blocks are respectively carried by Radio Resource Control (RRC) signalings.

In one embodiment, the M configuration information blocks are carried by a same RRC signaling.

In one embodiment, at least two of the M configuration information blocks are carried by different RRC signalings.

In one embodiment, the phrase that the second serving cell is added by the UE includes the meaning that the UE performs SCell addition on the second serving cell.

In one embodiment, the phrase that the second serving cell is added by the UE includes the meaning that an sCellToAddModList latest received by the UE includes the second serving cell.

In one embodiment, the phrase that the second serving cell is added by the UE includes the meaning that either an sCellToAddModList or an sCellToAddModListSCG latest received by the UE includes the second serving cell.

In one embodiment, the phrase that the second serving cell is added by the UE includes the meaning that the UE is assigned an SCellIndex for the second serving cell.

In one embodiment, the phrase that the second serving cell is added by the UE includes the meaning that the UE is assigned a ServCellIndex for the second serving cell.

In one embodiment, the index of the first serving cell is a CellIdentity.

In one embodiment, the index of the first serving cell is a PhysCellId.

In one embodiment, the index of the second serving cell is an SCellIndex.

In one embodiment, the index of the second serving cell is a ServCellIndex.

In one embodiment, the Q1 is greater than the Q2.
In one embodiment, the Q1 is 10.
In one embodiment, the Q1 is 28.
In one embodiment, the Q1 is 9.
In one embodiment, the Q2 is 5.
In one embodiment, the Q2 is 3.

In one embodiment, any of the M reference signals that is transmitted by the first serving cell comprises an SS/PBCH block.

In one embodiment, measurements on the M reference signals are used to determine M channel qualities, and the first reference signal corresponds to a maximum one of the M channel qualities.

In one embodiment, measurements on the M reference signals are used to determine M channel qualities, and one of the M channel qualities that corresponds to the first reference signal is greater than a first threshold.

In one embodiment, the N is equal to 1.
In one embodiment, the N is equal to 2.
In one embodiment, the N reference signal(s) comprises (comprise) a CSI-RS.

In one embodiment, the N reference signal(s) is(are) transmitted by the second serving cell.

In one embodiment, N1 reference signal(s) of the N reference signals is(are) transmitted by the second serving cell, while the other (N−N1) reference signal(s) of the N reference signals is(are) transmitted by a serving cell other than the second serving cell, the other serving cell being added by the UE, N1 being a positive integer less than N.

In one subembodiment, a maintenance base station for the other serving cell is the first base station in the present disclosure.

In one embodiment, the N reference signal(s) is(are) configured by the second serving cell.

In one embodiment, the N reference signal(s) is(are) configured by a serving cell other than the second serving cell, the other serving cell being added by the UE in the present disclosure.

In one embodiment, measurement(s) on the N reference signal(s) is(are) used to determine N channel quality(qualities); when each of the N channel quality(qualities) is greater than a second threshold, a transmission of the first radio signal is triggered; when at least one of the N channel quality(qualities) is no greater than the second threshold, the transmission of the first radio signal is not triggered.

In one embodiment, the target serving cell is maintained by the first base station in the present disclosure.

In one embodiment, the target serving cell is the second serving cell.

In one embodiment, the target serving cell is not the second serving cell.

In one subembodiment, the target serving cell and the second serving cell are maintained by a same base station.

In one embodiment, the first time-frequency resource pool occupies a frequency resource on the second serving cell.

In one embodiment, the first information is carried by a higher-layer signaling.

In one embodiment, the first information is carried by an RRC signaling.

In one embodiment, the first information is carried by a Medium Access Control layer Control Element (MAC CE) signaling.

In one embodiment, scheduling information of the second radio signal comprises at least one of time-domain resources occupied, frequency-domain resources occupied, a Modulation and Coding Scheme (MC S), configuration information of DMRS, a Hybrid Automatic Repeat reQuest (HARD) process number, a Redundancy Version (RV), a New Data Indicator (NDI), corresponding Spatial Tx parameters or corresponding Spatial Rx parameters.

In one embodiment, the configuration of DMRS comprises one or more of time-domain resources occupied, frequency-domain resources occupied, code-domain resources occupied, an RS sequence, a mapping mode, a DMRS type, cyclic shift, or an Orthogonal Cover Code (OCC).

In one embodiment, the phrase that the second radio signal carries a first data block means that the second radio signal is an output by all or part of bits in the first data block sequentially through part or all of CRC Attachment, Segmentation, CB-level CRC Attachment, Channel Coding, Rate Matching, Concatenation, Scrambling, a Modulation Mapper, a Layer Mapper, a transform precoder (used for generating complex-value signals), Precoding, a Resource Element Mapper, Multicarrier Symbol Generation, and Modulation and Upconversion.

In one embodiment, the phrase that the second radio signal carries a first data block means that the first data block is used to generate the second radio signal.

In one embodiment, the first base station transmits the second radio signal on the second serving cell.

In one embodiment, the first base station transmits the third radio signal on the second serving cell.

In one embodiment, a time resource occupied by the third radio signal is earlier than a time resource occupied by the second radio signal, and an index of the second data blocks among the K data blocks is smaller than an index of the first data block among the K data blocks.

In one embodiment, the uplink information explicitly indicates whether each of the K data blocks is correctly received.

In one embodiment, the uplink information implicitly indicates whether each of the K data blocks is correctly received.

In one embodiment, when the uplink information indicates that each of the K data blocks is correctly received, the first base station in the present disclosure discards all of the K data blocks.

In one embodiment, the UE transmits the uplink information on the second serving cell.

In one embodiment, the UE transmits the uplink information on a serving cell other than the second serving cell, the other serving cell being added by the UE.

In one embodiment, the radio resource occupied by the uplink information is configured by a serving cell added by the UE.

In one embodiment, the radio resource occupied by the uplink information is configured by the second serving cell.

In one embodiment, the radio resource occupied by the uplink information is configured by a serving cell other than the second serving cell, the other serving cell being added by the UE.

In one embodiment, the radio resource occupied by the uplink information is configured by a serving cell maintained by the first base station.

In one embodiment, the third information is transmitted by the second serving cell.

In one embodiment, the third information is transmitted by a serving cell other than the second serving cell, the other serving cell being added by the UE.

In one embodiment, the fourth information comprises a PhysCellId of the second serving cell.

In one embodiment, the backhaul link comprises a X2 interface.

In one embodiment, the backhaul link comprises a S1 interface.

In one embodiment, the backhaul link comprises a Xn interface.

In one embodiment, the second base station in the present disclosure receives first uplink information, the first uplink information being used to determine whether each of the K data blocks is correctly received.

In one subembodiment, the first uplink information is transmitted via an air interface.

In one subembodiment, the first uplink information is transmitted via a backhaul link.

In one embodiment, the first signaling is transmitted on a downlink physical layer control channel (i.e., a downlink channel only capable of carrying a physical layer signaling).

In one embodiment, the third information is transmitted on a downlink physical data channel (i.e., a downlink channel capable of carrying physical layer data).

In one embodiment, the M configuration information blocks are transmitted on a downlink physical layer data channel (i.e., a downlink channel capable of carrying physical layer data).

In one embodiment, the M configuration information blocks are transmitted on a downlink physical layer control channel (i.e., a downlink channel only capable of carrying a physical layer signaling).

In one embodiment, the first information is transmitted on a downlink physical layer data channel (i.e., a downlink channel capable of carrying physical layer data).

In one embodiment, the second radio signal is transmitted on a downlink physical layer data channel (i.e., a downlink channel capable of carrying physical layer data).

In one embodiment, a transmission channel for the second radio signal is a DownLink Shared Channel (DL-SCH).

In one embodiment, the uplink information is transmitted on an uplink physical layer data channel (i.e., an uplink channel capable of carrying physical layer data).

In one embodiment, the third radio signal is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

Embodiment 6

Figure 6:
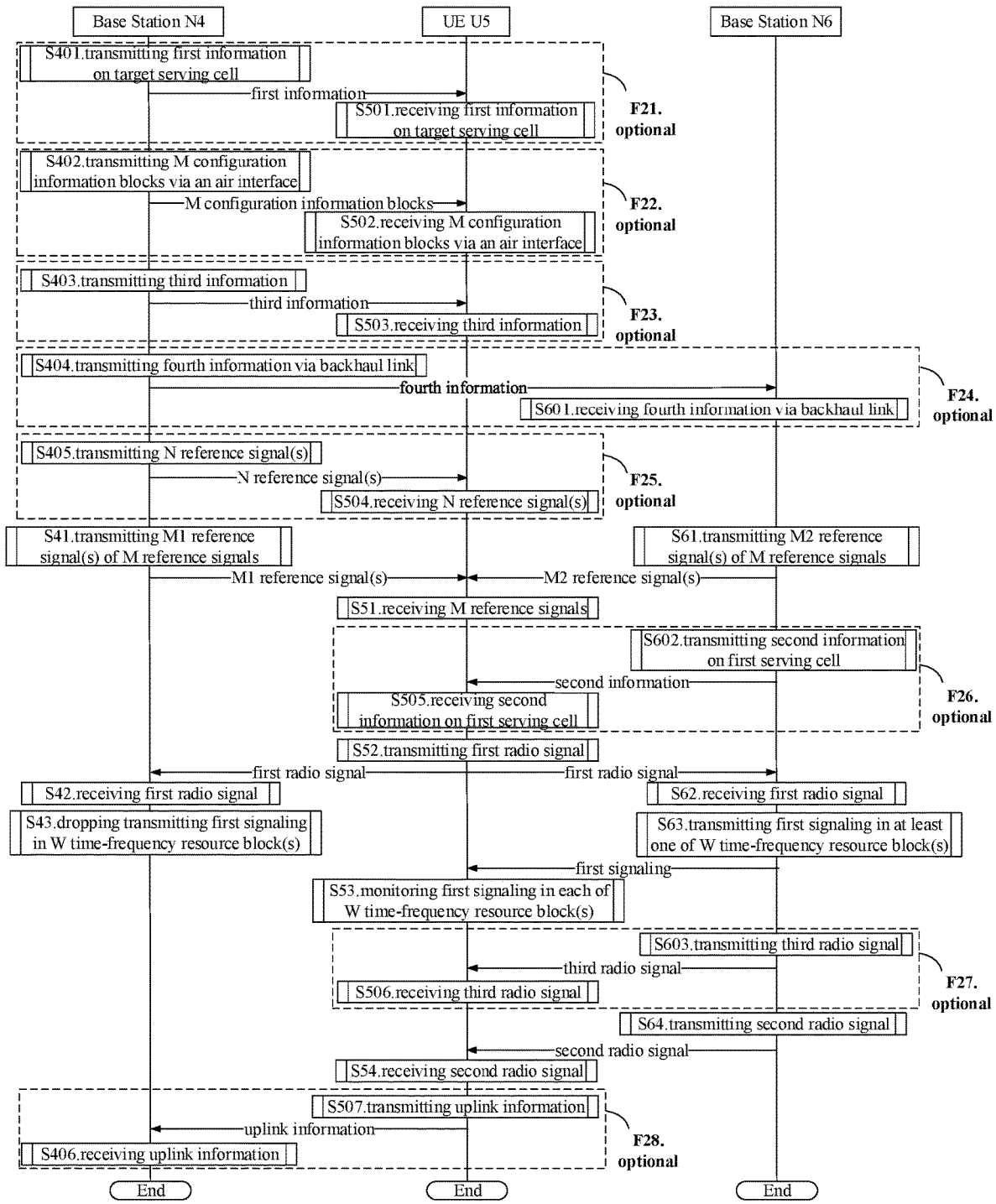
FIG. 6 illustrates a flowchart of a transmission according to one embodiment of the present disclosure.

Embodiment 6 illustrates a flowchart of a transmission, as shown in FIG. 6. In FIG. 6, a base station N4 is the first base station in the present disclosure, a base station N6 is the second base station in the present disclosure, and a UE U5 is the UE in the present disclosure. The base station N4 is a maintenance base station for the UE U5, and any serving cell maintained by the base station N6 is not added by the UE U5. In FIG. 6, steps marked by boxes F21-F28 are optional, respectively.

The N4 transmits first information on a target serving cell in step S401; and transmits M configuration information blocks via an air interface in step S402; transmits third information in step S403; transmits fourth information via a backhaul link in step S404; and transmits N reference signal(s) in step S405; transmits M1 reference signal(s) of M reference signals in step S41; receives a first radio signal in step 42; drops transmitting a first signaling in step S43; and receives uplink information in step S406.

The U5 receives first information on a target serving cell in step S501; and receives M configuration information blocks via an air interface in step S502; receives third information in step S503; receives N reference signal(s) in step S504; receives M reference signals in step S51; and receives second information on a first serving cell in step S505; transmits a first radio signal in step S52; monitors a first signaling in each of the W time-frequency resource block(s) in step S53; receives a third radio signal in step S506; receives a second radio signal in step S54; and transmits uplink information in step S507.

The N6 receives fourth information via a backhaul link in step S601; transmits M2 reference signal(s) of M reference signals in step S61; and transmits second information on a first serving cell in step S602; receives a first radio signal in step S62; transmits a first signaling in at least one of W time-frequency resource block(s) in step S63; transmits a third radio signal in step S603; and transmits a second radio signal in step S64.

In Embodiment 6, the first reference signal is transmitted by the first serving cell.

In one embodiment, if the first reference signal is transmitted by the first serving cell, the second base station in the present disclosure transmits the first signaling in at least one of the W time-frequency resource block(s).

In one embodiment, the second base station in the present disclosure transmits the first signaling in at least one of the W time-frequency resource block(s), and the second base station in the present disclosure transmits the second radio signal.

In one embodiment, the first base station in the present disclosure drops transmitting the first signaling in the W time-frequency resource block(s) and punctures in the W time-frequency resource block(s) in avoidance of interfering wireless transmission of another serving cell targeting the UE in the present disclosure.

In one embodiment, the first base station in the present disclosure drops transmitting the first signaling in the W time-frequency resource block(s) and buffers current data to be transmitted till next transmission opportunity.

In one embodiment, the first base station in the present disclosure drops transmitting the first signaling in the W time-frequency resource block(s) and discards current data to be transmitted.

In one embodiment, the fourth information is used by the second base station in the present disclosure for generating the first signaling.

In one embodiment, the fourth information is used by the second base station in the present disclosure for generating the second radio signal.

In one embodiment, the fourth information is used by the second base station in the present disclosure for generating the third radio signal.

In one embodiment, a time resource occupied by the third radio signal is earlier than a time resource occupied by the second radio signal, and an index of the second data block among the K data blocks is smaller than an index of the first data block among the K data blocks.

Embodiment 7

Figure 7:
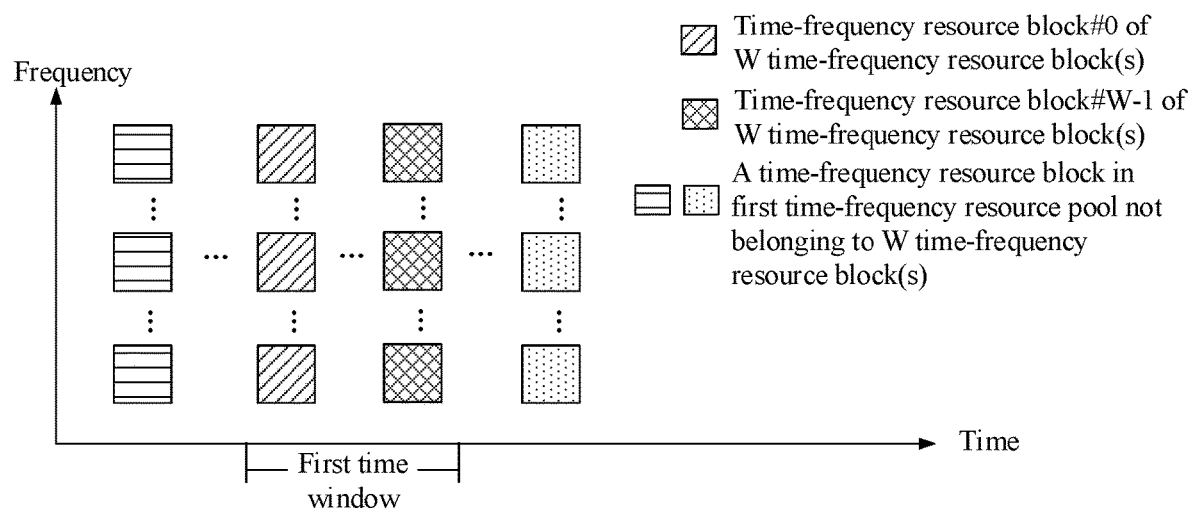
FIG. 7 illustrates a schematic diagram of resources mapping of W time-frequency resource block(s) in time-frequency domain according to one embodiment of the present disclosure.

Embodiment 7 illustrates a schematic diagram of resources mapping of W time-frequency resource block(s) in time-frequency domain; as shown in FIG. 7.

In Embodiment 7, the W time-frequency resource block(s) belongs(belong) to a section of the first time-frequency resource pool in the present disclosure that is located in a first time window, the first time-frequency resource pool comprising a positive integer number of time-frequency resource block(s). The first information in the present disclosure indicates the first time-frequency resource pool. In FIG. 7, index(es) of the W time-frequency resource block(s) is(are) #0 . . . , and #W−1, respectively; slash-filled boxes make up a time-frequency resource block #0 of the W time-frequency resource block(s), cross-filled boxes make up a time-frequency resource block #W−1 of the W time-frequency resource block(s), and, boxes filled with horizontal lines and boxes filled with dots respectively make up a time-frequency resource block in the first time-frequency resource pool not belonging to the W time-frequency resource block(s).

In one embodiment, the W is greater than 1.

In one embodiment, the W is equal to 1.

In one embodiment, any of the W time-frequency resource block(s) occupies a positive integer number of non-consecutive subcarriers in frequency domain.

In one embodiment, any of the W time-frequency resource block(s) occupies a positive integer number of consecutive multicarrier symbols in time domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, any two of the W time-frequency resource blocks occupy a same frequency resource.

In one embodiment, a time resource occupied by any of the W time-frequency resource block(s) is located in a slot.

In one embodiment, a time resource occupied by any of the W time-frequency resource block(s) is located in a sub-frame.

In one embodiment, a time resource occupied by any of the W time-frequency resource block(s) is located in a millisecond (ms).

In one embodiment, time resources respectively occupied by any two of the W time-frequency resource blocks are orthogonal (that is, non-overlapping).

In one embodiment, time resources respectively occupied by any two adjacent time-frequency resource blocks of the W time-frequency resource blocks are not consecutive.

In one embodiment, the W time-frequency resource blocks occur with equal time intervals.

In one embodiment, at least two adjacent time-frequency resource blocks of the W time-frequency resource blocks occupy consecutive time resources.

In one embodiment, at least two adjacent time-frequency resource blocks of the W time-frequency resource blocks occupy non-consecutive time resources.

In one embodiment, time resources occupied by any two of the W time-frequency resource blocks are of equal length.

In one embodiment, the first time-frequency resource pool comprises a positive integer number of Resource Element(s) (RE).

In one embodiment, any time-frequency resource block comprised in the first time-frequency resource pool comprises a positive integer number of RE(s).

In one embodiment, an RE occupies a multicarrier symbol in time domain and a subcarrier in frequency domain.

In one embodiment, the first time-frequency resource pool is a COntrol REsource SET (CORESET).

In one embodiment, the first time-frequency resource pool is a search space.

In one embodiment, the first time-frequency resource pool is indicated by a recoverySearchSpaceId.

In one embodiment, the first time-frequency resource pool is a search space identified by a recoverySearchSpaceId.

In one embodiment, the first time-frequency resource pool is indicated by a recoverySearchSpaceId field of a BeamFailureRecoveryConfig Information Element (IE).

In one embodiment, the first information is carried by a recoverySearchSpaceId.

In one embodiment, the first information is carried by a recoverySearchSpaceId field of a BeamFailureRecoveryConfig IE.

In one embodiment, the first information comprises a SearchSpaceId.

In one embodiment, the first information indicates an index of the first time-frequency resource pool.

In one embodiment, an index of the first time-frequency resource pool is a SearchSpaceId.

In one embodiment, any time-frequency resource block comprised in the first time-frequency resource pool occupies a positive integer number of non-consecutive subcarriers in frequency domain.

In one embodiment, any time-frequency resource block comprised in the first time-frequency resource pool occupies a positive integer number of consecutive multicarrier symbols in time domain.

In one embodiment, the first time-frequency resource pool occurs multiple times in time domain.

In one subembodiment, any two adjacent occurrences of the first time-frequency resource pool in time domain are spaced by an equal time interval.

In one embodiment, any time-frequency resource block comprised in the first time-frequency resource pool is a part of the first time-frequency resource pool in a sub-frame.

In one embodiment, any time-frequency resource block comprised in the first time-frequency resource pool is a section of the first time-frequency resource pool in a slot.

In one embodiment, any time-frequency resource block comprised in the first time-frequency resource pool is a section of the first time-frequency resource pool in a consecutive period.

In one embodiment, any two of time-frequency resource blocks comprised in the first time-frequency resource pool occupy a same frequency resource.

In one embodiment, time resources occupied by any two of time-frequency resource blocks comprised in the first time-frequency resource pool are orthogonal (that is, non-overlapping).

In one embodiment, any two adjacent time-frequency resource blocks of time-frequency resource blocks comprised in the first time-frequency resource pool occupy non-consecutive time resources.

In one embodiment, time-frequency resource blocks comprised in the first time-frequency resource pool occur with equal time intervals.

In one embodiment, at least two adjacent time-frequency resource blocks of time-frequency resource blocks comprised in the first time-frequency resource pool occupy consecutive time resources.

In one embodiment, at least two adjacent time-frequency resource blocks of time-frequency resource blocks comprised in the first time-frequency resource pool occupy non-consecutive time resources.

In one embodiment, time resources occupied by any two of time-frequency resource blocks comprised in the first time-frequency resource pool are of equal length.

In one embodiment, the first time window is a consecutive period.

In one embodiment, a start of the first time window is related to a time-domain resource occupied by the first radio signal.

In one embodiment, length of the first time window is unrelated to a time-domain resource occupied by the first radio signal.

In one embodiment, a time interval between a start of the first time window and an end time of a time unit occupied by the first radio signal is fixed, i.e., there is no need for configuration.

In one embodiment, a time interval between a start of the first time window and an end time of a time unit occupied by the first radio signal is 3 time units.

In one embodiment, the time unit is a consecutive period.

In one embodiment, the time unit is a slot.

In one embodiment, the time unit is a sub-frame.

In one embodiment, the time unit is 1 ms.

In one embodiment, the first radio signal is transmitted on an n-th slot, and a start of the first time window is a start time of an (n+4)-th slot.

In one embodiment, length of the first time window is configured by a higher-layer signaling.

In one embodiment, length of the first time window is configured by a BeamFailureRecoveryConfig IE.

In one embodiment, length of the first time window is configured by the target serving cell in the present disclosure through a BeamFailureRecoveryConfig IE.

In one embodiment, the W time-frequency resource block(s) is(are) earliest W time-frequency resource block(s) of a section of the first time-frequency resource pool in the first time window.

In one embodiment, a section of the first time-frequency resource pool in the first time window is composed of the W time-frequency resource block(s).

Embodiment 8

Figure 8:
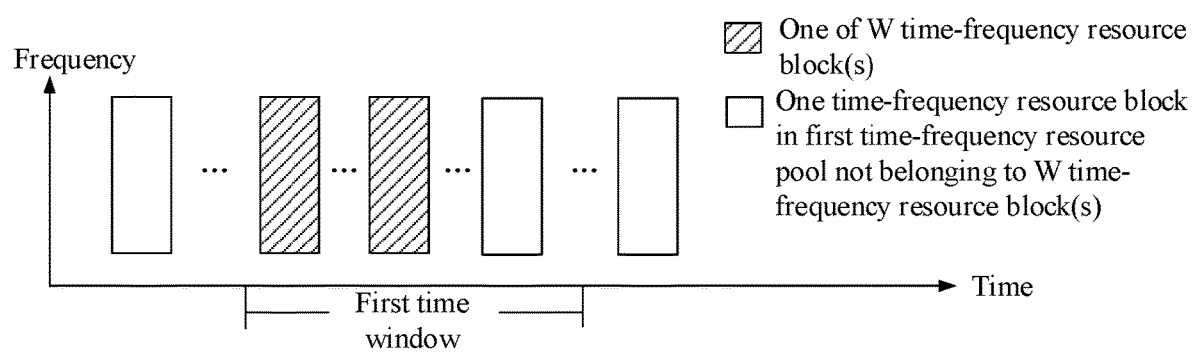
FIG. 8 illustrates a schematic diagram of resources mapping of W time-frequency resource block(s) in time-frequency domain according to one embodiment of the present disclosure.

Embodiment 8 illustrates a schematic diagram of resources mapping of W time-frequency resource block(s) in time-frequency domain; as shown in FIG. 8.

In Embodiment 8, the W time-frequency resource block(s) belongs(belong) to a section of the first time-frequency resource pool in the present disclosure that is located in a first time window, the first time-frequency resource pool comprising a positive integer number of time-frequency resource block(s). The first information in the present disclosure indicates the first time-frequency resource pool. In FIG. 8, a slash-filled box represents one of the W time-frequency resource block(s), while a blank box represents a time-frequency resource block in the first time-frequency resource pool not belonging to the W time-frequency resource block(s).

In one embodiment, a section of the first time-frequency resource pool in the first time window is composed of W1 time-frequency resource block(s), the W time-frequency resource block(s) being a subset of the W1 time-frequency resource block(s), W1 being a positive integer no less than W.

In one subembodiment, the W time-frequency resource block(s) is(are) W earliest time-frequency resource block(s) of the W1 time-frequency resource blocks.

In one embodiment, any of the W time-frequency resource block(s) occupies a positive integer number of consecutive subcarriers in frequency domain.

In one embodiment, any time-frequency resource block comprised in the first time-frequency resource pool occupies a positive integer number of consecutive subcarriers in frequency domain.

Embodiment 9

Figure 9:
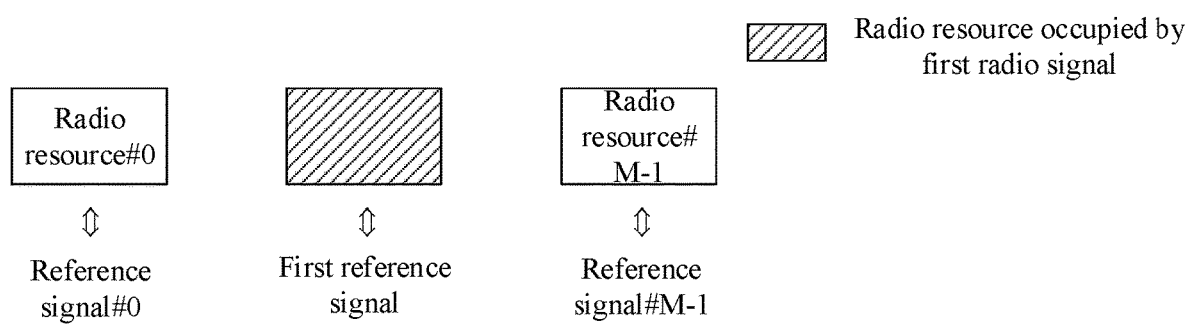
FIG. 9 illustrates a schematic diagram of a first radio signal indicating a first reference signal out of M reference signals according to one embodiment of the present disclosure.

Embodiment 9 illustrates a schematic diagram of a first radio signal indicating a first reference signal out of M reference signals; as shown in FIG. 9.

In Embodiment 9, a radio resource occupied by the first radio signal indicates the first reference signal out of the M reference signals. The radio resource occupied by the first radio signal is one of M radio resources, the M radio resources respectively corresponding to the M reference signals. In FIG. 9, the box filled with slashes represents a radio resource occupied by the first radio signal.

In one embodiment, a radio resource occupied by the first radio signal is used to indicate the first reference signal out of the M reference signals.

In one embodiment, a radio resource occupied by the first radio signal is one of M radio resources, the M radio resources respectively corresponding to the M reference signals.

In one embodiment, the M radio resources are configured by a higher-layer signaling.

In one embodiment, the M radio resources are configured by an RRC signaling.

In one embodiment, the M radio resources are configured by a BeamFailureRecoveryConfig IE.

In one embodiment, the M radio resources are UE-specific.

In one embodiment, the M radio resources are configured by the second serving cell in the present disclosure.

In one embodiment, the M radio resources are configured by a serving cell other than the second serving cell in the present disclosure, the other serving cell being added by the UE in the present disclosure, and also being maintained by the first base station in the present disclosure.

In one embodiment, a radio resource occupied by the first radio signal comprises one or more of a time resource, a frequency resource, or a code-domain resource.

In one embodiment, any of the M radio resources comprises one or more of a time resource, a frequency resource, or a code-domain resource.

In one embodiment, a second information unit indicates a radio resource occupied by the first radio signal; the second information unit comprises a first field and a second field; the first field of the second information unit indicates an index of the first reference signal; and the second field of the second information unit indicates a radio resource occupied by the first radio signal.

In one subembodiment, the second information unit comprises part or all of information in PRACH-ResourceDedicatedBFR.

In one subembodiment, the PRACH-ResourceDedicatedBFR comprises the second information unit.

In one subembodiment, the second information unit comprises part or all of information in a candidateBeamRSList field of a BeamFailureRecoveryConfig IE.

In one subembodiment, the first field of the second information unit indicates an SSB-Index or an NZP-CSI-RS-ResourceId.

In one subembodiment, the second field of the second information unit is a ra-PreambleIndex.

In one embodiment, for detailed definition of the PRACH-ResourceDedicatedBFR, refer to 3GPP TS38.331.

In one embodiment, for detailed definition of the BeamFailureRecoveryConfig IE, refer to 3GPP TS38.331.

In one embodiment, for detailed definition of the candidateBeamRSList, refer to 3GPP TS38.331.

In one embodiment, M is a positive integer no greater than maxNrofCandidateBeams.

In one embodiment, the first base station in the present disclosure performs blind detection on the first radio signal in W radio resource(s), and successfully receives the first radio signal in one of the W radio resource(s) corresponding to the first reference signal.

In one embodiment, the blind detection refers to coherent reception, which means performing coherent reception employing a code-domain resource comprised by one of the W radio resource(s) on a corresponding radio resource, and measuring energy of a signal obtained by the coherent reception. If the energy of the signal obtained by the coherent reception is greater than a first given threshold, it is determined that the first radio signal is successfully received; or if the energy of the signal obtained by the coherent reception is no greater than a first given threshold, it is determined that the first radio signal is not successfully received.

In one embodiment, the second base station in the present disclosure performs blind detection on the first radio signal in W radio resource(s), and successfully receives the first radio signal in one of the W radio resource(s) corresponding to the first reference signal.

In one embodiment, the second base station in the present disclosure performs blind detection on the first radio signal in W4 radio resource(s) of the W radio resources; if the first radio signal is successfully received in any of the W4 radio resource(s), it is determined that the first reference signal is transmitted by a serving cell maintained by the second base station, or if the first radio signal is not successfully received in any of the W4 radio resource(s), it is determined that the first reference signal is not transmitted by any serving cell maintained by the second base station. The W4 radio resource(s) is(are) radio resource(s) of the W radio resources respectively corresponding to W4 reference signal(s), and the W4 reference signal(s) is(are) reference signal(s) of the W reference signals transmitted by a serving cell maintained by the second base station, W4 being a positive integer less than W.

In one subembodiment, the W4 reference signal(s) is(are) the W2 reference signal(s), W4 being equal to W2.

In one subembodiment, the W4 reference signals comprise the W2 reference signal(s), W4 being greater than W2.

Embodiment 10

Figure 10:
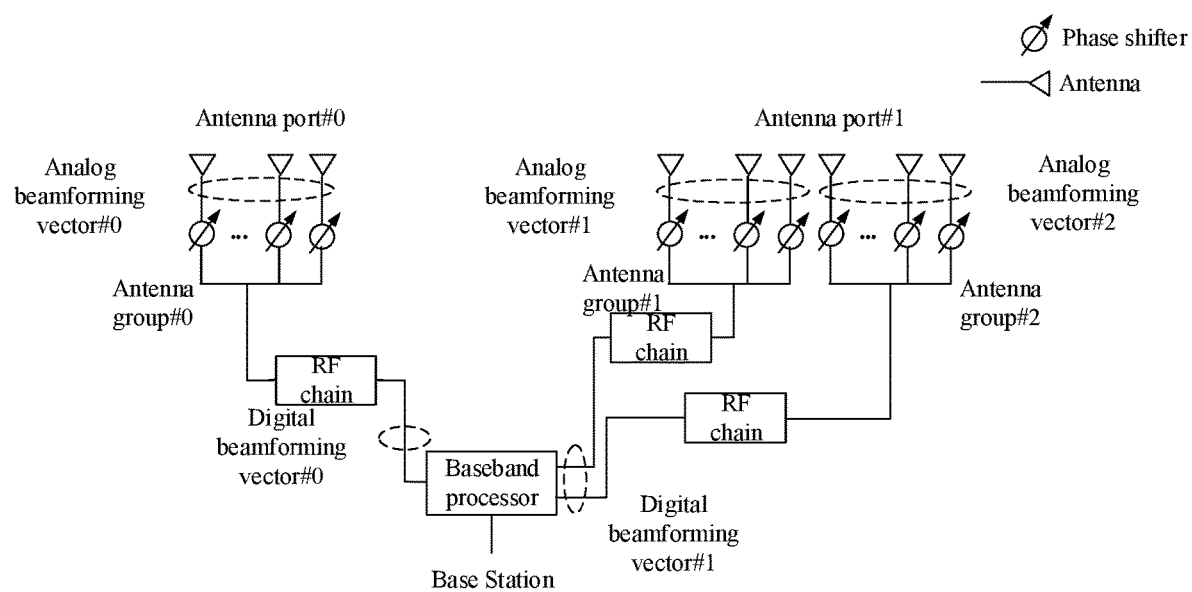
FIG. 10 illustrates a schematic diagram of antenna ports according to one embodiment of the present disclosure.

Embodiment 10 illustrates a schematic diagram of antenna ports; as shown in FIG. 10.

In Embodiment 10, one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) comprised in the given antenna port are arranged diagonally to form an analog beamforming matrix corresponding to the given antenna port.

Mapping coefficients from the positive integer number of antenna group(s) comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port.

FIG. 10 illustrates two antenna ports, namely, antenna port #0 and antenna port #1. Herein, the antenna port #0 consists of antenna group #0, while the antenna port #1 consists of antenna group #1 and antenna group #2. Mapping coefficients from multiple antennas of the antenna group #0 to the antenna port #0 constitute an analog beamforming vector #0; mapping coefficients from the antenna group #0 to the antenna port #0 constitute a digital beamforming vector #0; a beamforming vector corresponding to the antenna port #0 is acquired as a product of the analog beamforming vector #0 and the digital beamforming vector #0. Mapping coefficients from multiple antennas of the antenna group #1 to the antenna port #1 and mapping coefficients from multiple antennas of the antenna group #2 to the antenna port #1 respectively constitute an analog beamforming vector #1 and an analog beamforming vector #2; mapping coefficients from the antenna group #1 and the antenna group #2 to the antenna port #1 constitute a digital beamforming vector #1; a beamforming vector corresponding to the antenna port #1 is acquired as a product of the digital beamforming vector #1 and an analog beamforming matrix formed by the analog beamforming vector #1 and the analog beamforming vector #2 which are diagonally arranged.

In one embodiment, the specific meaning of the antenna port can be found in 3GPP TS36.211, section 5.2 and section 6.2, or can be found in 3GPP TS38.211, section 4.4.

In one embodiment, small-scale channel parameters of a channel that a radio signal transmitted from one antenna port goes through can be used to infer those of a channel that another radio signal transmitted from the antenna port goes through.

In one embodiment, small-scale channel parameters of a channel that a radio signal transmitted from one antenna port goes through cannot be used to infer those of a channel that another radio signal transmitted from the antenna port goes through.

In one embodiment, the small-scale channel parameters include one or more of Channel Impulse Response (CIR), a Precoding Matrix Indicator (PMI), a Channel Quality Indicator (CQI) or a Rank Indicator (RI).

In one embodiment, an antenna port only comprises one antenna group, i.e., one RF chain, for instance, the antenna port #0 in FIG. 10.

In one subembodiment of the above embodiment, the analog beamforming matrix corresponding to the one antenna port is dimensionally reduced to an analog beamforming vector, and the digital beamforming vector corresponding to the one antenna port is dimensionally reduced to a scaler, a beamforming vector corresponding to the one antenna port being equivalent to an analog beamforming vector corresponding thereto. For example, the antenna port #0 in FIG. 10 only comprises the antenna port #0, the digital beamforming vector #0 in FIG. 10 is subjected to dimensionality reduction to form a scaler, a beamforming vector corresponding to the antenna port #0 is the analog beamforming vector #0.

In one embodiment, an antenna port comprises multiple antenna groups, i.e., multiple RF chains, for instance, the antenna port #1 in FIG. 10.

In one embodiment, the specific meaning of the word Quasi Co-Located (QCL) can be found in 3GPP TS38.211, section 4.4, or 3GPP TS38.214, section 5.1.5.

In one embodiment, two antenna ports being QCL means that large-scale properties of a channel that a radio signal transmitted from one of the two antenna ports goes through can be used to infer large-scale properties of a channel that a radio signal transmitted from the other of the two antenna ports goes through.

In one embodiment, the large-scale properties include one or more of delay spread, Doppler spread, Doppler shift, average gain, average delay or Spatial Rx parameters.

In one embodiment, Spatial Rx parameters comprise one or more of a receiving beam, a reception analog beamforming matrix, a reception analog beamforming vector, a reception digital beamforming vector, a reception beamforming vector, or Spatial Domain Receive Filter.

Embodiment 11

Figure 11:
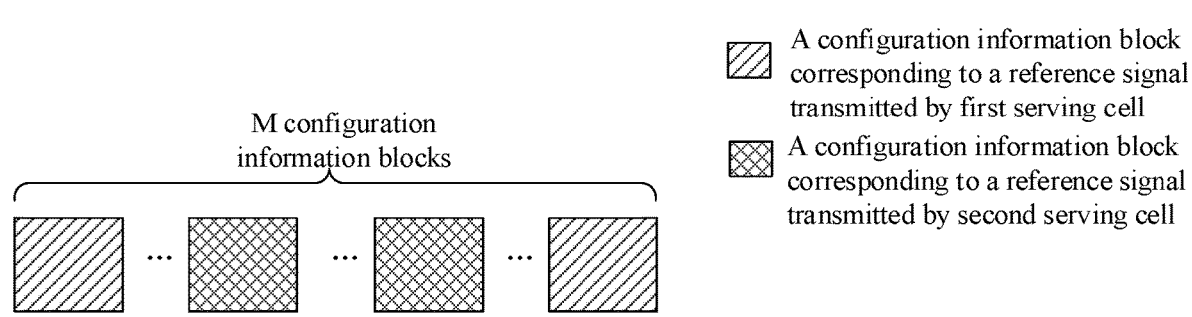
FIG. 11 illustrates a schematic diagram of M configuration information blocks according to one embodiment of the present disclosure.

Embodiment 11 illustrates a schematic diagram of M configuration information blocks; as shown in FIG. 11.

In Embodiment 11, the M configuration information blocks respectively indicate the M reference signals in the present disclosure; at least one of the M reference signals is transmitted by the second serving cell in the present disclosure, the second serving cell being added by the UE in the present disclosure; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell. In FIG. 11, a flash-filled box represents a configuration information block corresponding to a reference signal transmitted by the first serving cell in the present disclosure, and a cross-filled box represents a configuration information block corresponding to a reference signal transmitted by the second serving cell in the present disclosure.

In one embodiment, of the M reference signals each reference signal transmitted by the first serving cell in the present disclosure comprises an SS/PBCH block.

In one embodiment, any of the M reference signals transmitted by the first serving cell in the present disclosure comprises an SS/PBCH block.

In one embodiment, of the M reference signals each reference signal transmitted by the second serving cell in the present disclosure comprises an SS/PBCH block.

In one embodiment, of the M reference signals each reference signal transmitted by the second serving cell in the present disclosure comprises a CSI-RS.

In one embodiment, each of the M configuration information blocks that corresponds to a reference signal transmitted by the first serving cell comprises a first-type index, which indicates an SS/PBCH block transmitted by the first serving cell.

In one subembodiment, the first-type index is an SS/PBCH block index.

In one embodiment, each of the M configuration information blocks that corresponds to a reference signal transmitted by the first serving cell comprises a ra-PreambleIndex.

In one embodiment, each of the M reference signals that is transmitted by the first serving cell is one of reference signals configured by a candidateBeamRSList.

In one embodiment, each of the M configuration information blocks that corresponds to a reference signal transmitted by the first serving cell comprises partial information in a BeamFailureRecoveryConfig IE.

In one embodiment, each of the M configuration information blocks that corresponds to a reference signal transmitted by the first serving cell comprises part or all of information in a candidateBeamRSList field of a BeamFailureRecoveryConfig IE.

In one embodiment, each of the M configuration information blocks that corresponds to a reference signal transmitted by the first serving cell is carried by a BeamFailureRecoveryConfig IE.

In one embodiment, each of the M configuration information blocks that corresponds to a reference signal transmitted by the first serving cell is carried by a third information unit, the third information unit comprising part or all of information in a BeamFailureRecoveryConfig IE.

In one embodiment, each of the M configuration information blocks that corresponds to a reference signal transmitted by the first serving cell is carried by a candidateBeamRSList.

In one embodiment, each of the M configuration information blocks that corresponds to a reference signal transmitted by the first serving cell is carried by a third information unit, the third information unit comprising part or all of information in a candidateBeamRSList.

In one embodiment, each of the M configuration information blocks that corresponds to a reference signal transmitted by the first serving cell is carried by a PRACH-ResourceDedicatedBFR.

In one embodiment, each of the M configuration information blocks that corresponds to a reference signal transmitted by the first serving cell comprises part or all of information in a PRACH-ResourceDedicatedBFR.

In one embodiment, each of the M configuration information blocks that corresponds to a reference signal transmitted by the second serving cell comprises an NZP-CSI-RS-ResourceId or an SSB-Index.

In one embodiment, each of the M configuration information blocks that corresponds to a reference signal transmitted by the second serving cell indicates a CSI-RS resource or an SS/PBCH block resource.

In one embodiment, each of the M configuration information blocks that corresponds to a reference signal transmitted by the second serving cell indicates a CSI-RS or a SS/PBCH block.

In one embodiment, each of the M configuration information blocks that corresponds to a reference signal transmitted by the second serving cell comprises a ra-PreambleIndex.

In one embodiment, each of the M reference signals that is transmitted by the second serving cell is one of reference signal(s) configured by a candidateBeamRSList.

In one embodiment, the candidateBeamRSList is a field of a BeamFailureRecoveryConfig IE.

In one embodiment, each of the M configuration information blocks that corresponds to a reference signal transmitted by the second serving cell comprises partial information in a BeamFailureRecoveryConfig IE.

In one embodiment, each of the M configuration information blocks that corresponds to a reference signal transmitted by the second serving cell comprises part or all of information in a candidateBeamRSList field of a BeamFailureRecoveryConfig IE.

In one embodiment, each of the M configuration information blocks that corresponds to a reference signal transmitted by the second serving cell is carried by a BeamFailureRecoveryConfig IE.

In one embodiment, each of the M configuration information blocks that corresponds to a reference signal transmitted by the second serving cell is carried by a first information unit, the first information unit comprising part or all of information in a BeamFailureRecoveryConfig IE.

In one embodiment, each of the M configuration information blocks that corresponds to a reference signal transmitted by the second serving cell is carried by a candidateBeamRSList.

In one embodiment, each of the M configuration information blocks that corresponds to a reference signal transmitted by the second serving cell is carried by a first information unit, the first information unit comprising part or all of information in a candidateBeamRSList.

In one embodiment, each of the M configuration information blocks that corresponds to a reference signal transmitted by the second serving cell is carried by a PRACH-ResourceDedicatedBFR.

In one embodiment, each of the M configuration information blocks that corresponds to a reference signal transmitted by the second serving cell comprises part or all of information in a PRACH-ResourceDedicatedBFR.

In one embodiment, each of the M configuration information blocks comprises a second-type index, the second-type index indicating a radio resource.

In one subembodiment, for any given configuration information block of the M configuration information blocks, a second-type index comprised in the given configuration information block indicates a given radio resource; if the first reference signal is a reference signal corresponding to the given configuration information block, the first radio signal is transmitted on the given radio resource.

In one subembodiment, a second-type index in any of the M configuration information blocks indicates a radio resource out of P1 candidate radio resources, and the P1 candidate radio resources are configured by a serving cell added by the UE via an RRC signaling, P1 being a positive integer greater than 1.

In one subembodiment, for each of the M configuration information blocks that corresponds to a reference signal transmitted by the second serving cell, the second-type index is a ra-PreambleIndex.

In one subembodiment, for each of the M configuration information blocks that corresponds to a reference signal transmitted by the first serving cell, the second-type index is a ra-PreambleIndex.

In one embodiment, each of the M configuration information blocks that corresponds to the first reference signal comprises a radio resource occupied by the first radio signal.

In one embodiment, each of the M configuration information blocks that corresponds to the first reference signal indicates a preamble sequence employed by the first radio signal.

In one embodiment, each of the M configuration information blocks that corresponds to the first reference signal indicates a PRACH resource employed by the first radio signal.

Embodiment 12

Figure 12:
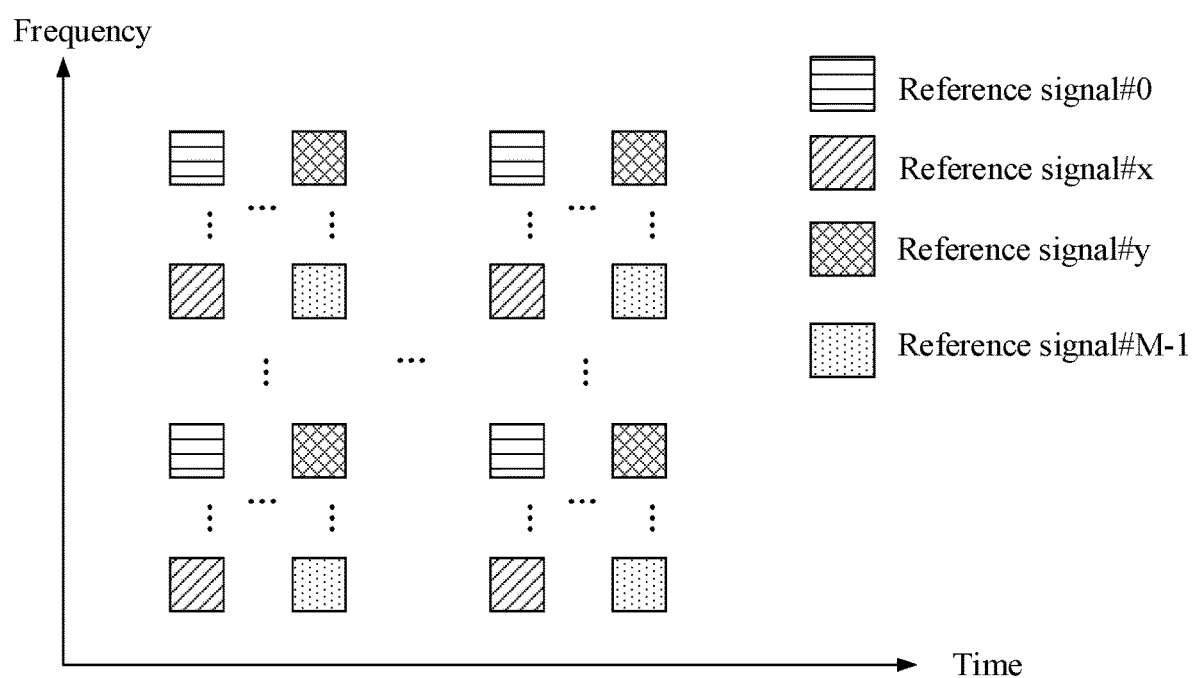
FIG. 12 illustrates a schematic diagram of resources mapping of M reference signals in time-frequency domain according to one embodiment of the present disclosure.

Embodiment 12 illustrates a schematic diagram of resources mapping of M reference signals in time-frequency domain; as shown in FIG. 12.

In Embodiment 12, the UE in the present disclosure receives the M reference signals. Measurements on the M reference signals are respectively used to determine M channel qualities, the M channel qualities being used by the UE for determining the first reference signal in the present disclosure. At least one of the M reference signals is transmitted by the first serving cell in the present disclosure, and at least one of the M reference signals is transmitted by the second serving cell in the present disclosure. In FIG. 12, indexes of the M reference signals are #0 . . . , #x . . . , #y . . . , and #M−1, respectively; x and y are respectively positive integers less than M−1, y being unequal to x.

In one embodiment, any of the M reference signals is a CSI-RS or an SS/PBCH block.

In one embodiment, measurements on the M reference signals are respectively used to determine M channel qualities.

In one embodiment, the first reference signal corresponds to a maximum one of the M channel qualities.

In one embodiment, one of the M channel qualities that corresponds to the first reference signal is greater than a first threshold.

In one subembodiment, the first threshold is configured by rsrp-ThresholdSSB.

In one subembodiment, the first threshold is configured by the second serving cell.

In one subembodiment, the first threshold is configured by a serving cell added by the UE.

In one subembodiment, the first threshold is measured by dB.

In one subembodiment, the first threshold is UE-specific.

In one embodiment, the M channel qualities are Reference Signal Received Powers (RSRP) respectively.

In one embodiment, the M channel qualities are L1-RSRPs respectively.

In one embodiment, M3 reference signal(s) of the M reference signals is(are) SS/PBCH block(s), while the other (M-M3) reference signal(s) is(are) CSI-RS(s); M3 channel quality(qualities) of the M channel qualities respectively corresponding to the M3 reference signal(s) is(are) RSRP(s) of the M3 reference signal(s); the other (M-M3) channel quality(qualities) of the M channel qualities respectively corresponding to the (M-M3) reference signal(s) is(are) obtained by respectively adding (M-M3) offset(s) to RSRP(s) of the (M-M3) reference signal(s).

In one subembodiment, the (M-M3) offset(s) respectively corresponds(correspond) to RSRP(s) of the (M-M3) reference signal(s).

In one subembodiment, for any given channel quality of the (M-M3) channel quality(qualities), the given channel quality is equal to a sum of an offset of the (M-M3) offset(s) corresponding to the given channel quality and an RSRP of a reference signal corresponding to the given channel quality.

In one subembodiment, the (M-M3) offset(s) is(are) measured by dB, respectively.

In one subembodiment, the RSRP is measured by dB.

In one subembodiment, the (M-M3) offset(s) is(are) respectively configured by powerControlOffsetSS.

In one embodiment, any of the M reference signals occurs multiple times in time domain.

In one subembodiment, any two adjacent occurrences of any reference signal of the M reference signals in time domain are spaced by an equal time interval.

In one embodiment, any of the M reference signals occurs periodically in time domain.

In one embodiment, at least one of the M reference signals occurs periodically in time domain.

In one embodiment, at least one of the M reference signals is wideband.

In one embodiment, a system bandwidth is divided into a positive integer number of frequency-domain areas, and at least one of the M reference signals occurs in each of the frequency-domain areas, any of the frequency-domain areas comprising a positive integer number of consecutive subcarriers.

In one embodiment, at least one of the M reference signals is narrowband.

In one embodiment, a system bandwidth is divided into a positive integer number of frequency-domain areas, and at least one of the M reference signals occurs only in part of the positive integer number of frequency-domain areas, any of the frequency-domain areas comprising a positive integer number of consecutive subcarriers.

In one embodiment, any reference signal of the M2 reference signal(s) in the present disclosure is narrowband.

In one embodiment, a system bandwidth is divided into a positive integer number of frequency-domain areas, and at least one of the M2 reference signal(s) in the present disclosure occurs only in part of the positive integer number of frequency-domain areas, any of the frequency-domain areas comprising a positive integer number of consecutive subcarriers.

In one embodiment, any two frequency-domain areas of the positive integer number of frequency-domain areas comprise equal numbers of subcarriers.

Embodiment 13

Embodiment 13 illustrates a schematic diagram of second information according to one embodiment of the present disclosure; as shown in FIG. 13.

In Embodiment 13, the UE in the present disclosure receives the second information on the first serving cell in the present disclosure, the second information indicates M2 reference signal(s) of the M reference signals in the present disclosure and an index of the first serving cell in the present disclosure, and the M2 reference signal(s) is(are) transmitted by the first serving cell.

In one embodiment, the second information is carried by (an) SS/PBCH block(s) transmitted from the first serving cell.

In one embodiment, each SS/PBCH block transmitted from the first serving cell implicitly indicates the second information.

In one embodiment, the second information is carried by the M2 reference signal(s).

In one embodiment, the M2 reference signal(s) is(are) M2 SS/PBCH block(s) transmitted by the first serving cell, the M2 reference signal(s) indicating the second information.

In one embodiment, the M2 reference signal(s) is(are) M2 SS/PBCH block(s) transmitted by the first serving cell; SS(s) comprised in the M2 reference signal(s) indicates(indicate) an index of the first serving cell.

In one subembodiment, a Primary synchronization sequence and a Secondary synchronization sequence comprised in the M2 reference signal(s) implicitly indicate an index of the first serving cell.

In one embodiment, the second information indicates index(s) of the M2 reference signal(s).

In one embodiment, index(s) of the M2 reference signal(s) is(are) SS/PBCH Block (SSB) index(es).

In one embodiment, the M2 reference signal(s) is(are) M2 SS/PBCH block(s) transmitted by the first serving cell; for any given reference signal of the M2 reference signal(s), at least the former of a DMRS and a PBCH payload on a PBCH in the given reference signal is used to indicate an index of the given reference signal.

In one subembodiment, a DMRS sequence on a PBCH in the given reference signal implicitly indicates an index of the given reference signal.

In one subembodiment, a DMRS sequence on a PBCH in the given reference signal and payload bits $\bar{a}_{\bar{A}+5}, \bar{a}_{\bar{A}+6}, \bar{a}_{\bar{A}+7}$ of the PBCH jointly indicate an index of the given reference signal.

In one subembodiment, a DMRS sequence on a PBCH in the given reference signal implicitly indicates 3 Least Significant Bits (LSB) of an index of the given reference signal, while payload bits $\bar{a}_{\bar{A}+5}, \bar{a}_{\bar{A}+6}, \bar{a}_{\bar{A}+7}$ of the PBCH in the given reference signal indicates 3 Most Significant Bit (MSB) of an index of the given reference signal.

In one embodiment, detailed definition of the PBCH payload bits $\bar{a}_{\bar{A}+5}, \bar{a}_{\bar{A}+6}, \bar{a}_{\bar{A}+7}$ can be found in 3GPP TS38.213 and TS38.212.

Embodiment 14

Figure 14:
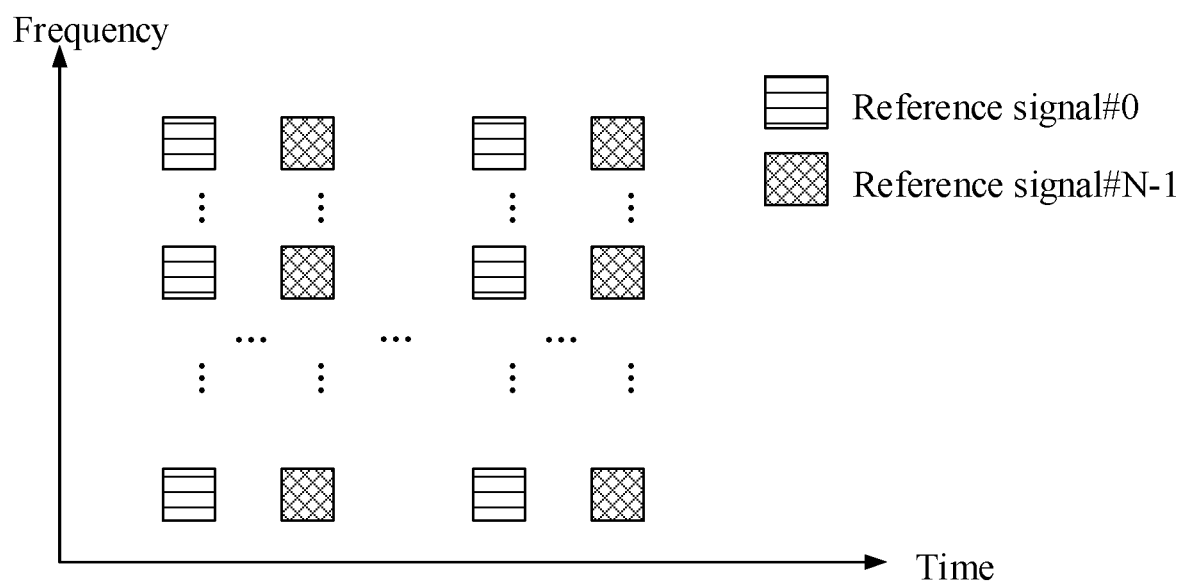
FIG. 14 illustrates a schematic diagram of resources mapping of N reference signal(s) in time-frequency domain according to one embodiment of the present disclosure.

Embodiment 14 illustrates a schematic diagram of resources mapping of N reference signal(s) in time-frequency domain; as shown in FIG. 14.

In Embodiment 14, the UE in the present disclosure receives the N reference signal(s). Measurement(s) on the N reference signal(s) is(are) used to trigger a transmission of the first radio signal in the present disclosure. Measurement(s) on the N reference signal(s) is(are) respectively used to determine N channel quality(qualities). The channel quality(qualities) is(are) respectively used to determine whether a transmission of the first radio signal is triggered. In FIG. 14, index(es) of the N reference signal(s) is(are) #0 . . . , and #N−1, respectively.

In one embodiment, the N reference signal(s) comprises (comprise) a CSI-RS.

In one embodiment, any of the N reference signal(s) is a CSI-RS.

In one embodiment, any of the N reference signal(s) is a periodic CSI-RS.

In one embodiment, the N reference signal(s) comprises (comprise) an SS/PBCH block.

In one embodiment, the N reference signal(s) is(are) indicated by a failureDetectionResourcesToAddModList.

In one embodiment, the N reference signal(s) is(are) indicated by a failureDetectionResourcesToAddModList field of a RadioLinkMonitoringConfig IE.

In one embodiment, the N reference signal(s) is(are) indicated by a tci-StatesPDCCH-ToAddList.

In one embodiment, the N reference signal(s) is(are) indicated by a tci-StatesPDCCH-ToAddList field of a ControlResourceSet IE.

In one embodiment, the N reference signal(s) is(are) respectively indicated by N configuration information block(s).

In one embodiment, any of the N configuration information block(s) comprises an NZP-CSI-RS-ResourceId.

In one embodiment, any of the N configuration information block(s) comprises an SSB-Index or an NZP-CSI-RS-ResourceId.

In one embodiment, the N configuration information block(s) is(are) respectively carried by N RadioLinkMonitoringRS(s).

In one embodiment, each of the N configuration information block(s) comprises part of or all content of a RadioLinkMonitoringRS.

In one embodiment, the N configuration information block(s) is(are) carried by a failureDetectionResourcesToAddModList.

In one embodiment, the N configuration information block(s) is(are) carried by a failureDetectionResourcesToAddModList field of a RadioLinkMonitoringConfig IE.

In one embodiment, the N configuration information block(s) is(are) N TCI-State IE(s).

In one embodiment, the N configuration information block(s) is(are) carried by a tci-StatesPDCCH-ToAddList.

In one embodiment, the N configuration information block(s) is(are) carried by a tci-StatesPDCCH-ToAddList field of a ControlResourceSet IE.

In one embodiment, for the detailed definition of failureDetectionResourcesToAddModList, refer to 3GPP TS38.331.

In one embodiment, for the detailed definition of RadioLinkMonitoringConfig IE, refer to 3GPP TS38.331.

In one embodiment, for the detailed definition of RadioLinkMonitoringRS, refer to 3GPP TS38.331.

In one embodiment, for the detailed definition of ControlResourceSet IE, refer to 3GPP TS38.331.

In one embodiment, for the detailed definition of tci-StatesPDCCH-ToAddList, refer to 3GPP TS38.331.

In one embodiment, for the detailed definition of TCI-State IE, refer to 3GPP TS38.331.

In one embodiment, measurement(s) on the N reference signal(s) is(are) respectively used to determine N channel quality(qualities); if each of the N channel quality(qualities) is larger than a second threshold, a transmission of the first radio signal is triggered; if at least one of the N channel quality(qualities) is no larger than a second threshold, a transmission of the first radio signal is not triggered.

In one subembodiment, the second threshold is configured by a rlmInSyncOutOfSyncThreshold.

In one subembodiment, the second threshold is configured by the second serving cell in the present disclosure.

In one subembodiment, the second threshold is configured by a serving cell added by the UE.

In one subembodiment, the second threshold is a positive real number less than 1.

In one embodiment, the N channel quality(qualities) is(are) respectively BLock Error Rate(s) (BLER).

In one embodiment, the N channel quality(qualities) is(are) respectively hypothetical BLER(s).

In one embodiment, the N channel quality(qualities) is(are) obtained respectively according to hypothetical PDCCH transmission parameters; for the detailed definition of the hypothetical PDCCH transmission parameters, refer to 3GPP TS38.133.

In one embodiment, any of the N reference signal(s) occurs multiple times in time domain.

In one subembodiment, any two adjacent occurrences of any reference signal of the N reference signal(s) in time domain are spaced by an equal time interval.

In one embodiment, any of the N reference signal(s) occurs periodically in time domain.

In one embodiment, at least one of the N reference signal(s) is wideband.

In one embodiment, a system bandwidth is divided into a positive integer number of frequency-domain areas, and at least one of the N reference signal(s) occurs in each of the positive integer number of frequency-domain areas, any of the frequency-domain areas comprising a positive integer number of consecutive subcarriers.

In one embodiment, at least one of the N reference signal(s) is narrowband.

In one embodiment, a system bandwidth is divided into a positive integer number of frequency-domain areas, and at least one of the N reference signal(s) occurs only in part of the positive integer number of frequency-domain areas, any of the frequency-domain areas comprising a positive integer number of consecutive subcarriers.

Embodiment 15

Figure 15:
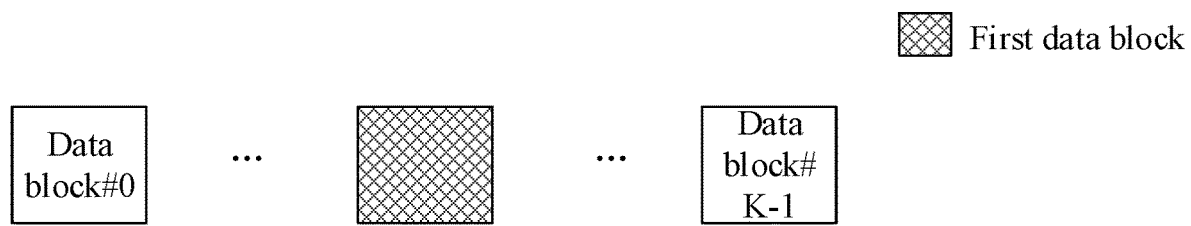
FIG. 15 illustrates a schematic diagram of a relationship between a first data block and K data blocks according to one embodiment of the present disclosure.

Embodiment 15 illustrates a relationship between a first data block and K data blocks; as shown in FIG. 15.

In Embodiment 15, the second radio signal in the present disclosure carries the first data block, the first data block being one of the K data blocks. In FIG. 15, indexes of the K data blocks are #0 . . . , and #K−1, respectively.

In one embodiment, the K data blocks are respectively K Protocol Data Units. (PDUs).

In one embodiment, the K data blocks are respectively K Packet Data Convergence Protocol (PDCP) PDUs.

In one embodiment, an index of the first data block in the K data blocks is a Sequence Number (SN).

In one embodiment, an index of each data block in the K data blocks is a Sequence Number (SN).

In one embodiment, the third radio signal in the present disclosure carries a second data block, the second data block being one of the K data blocks; a time resource occupied by the third radio signal is earlier than a time resource occupied by the second radio signal. If the third radio signal and the second radio signal are transmitted by the first base station in the present disclosure, an index of the second data block in the K data blocks is smaller than that of the first data block in the K data blocks. If the third radio signal and the second radio signal are transmitted by the second base station in the present disclosure, an index of the second data block in the K data blocks is larger than that of the first data block in the K data blocks.

Embodiment 16

Figure 16:
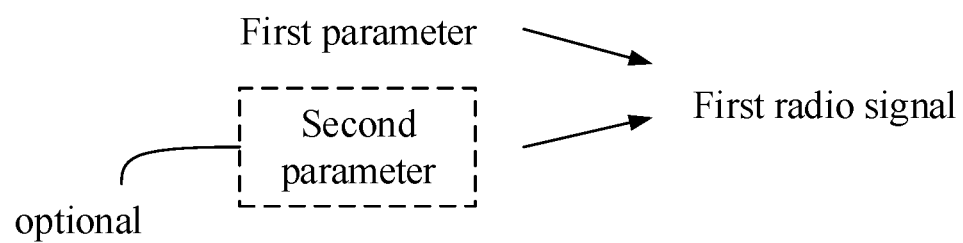
FIG. 16 illustrates a schematic diagram of generating a first radio signal according to one embodiment of the present disclosure.

Embodiment 16 illustrates a schematic diagram of generating a first radio signal; as shown in FIG. 16.

In Embodiment 16, at least a former of a first parameter and a second parameter is used to generate the first radio signal.

In one embodiment, the first radio signal is transmitted by the second serving cell in the present disclosure, a PhysCellId of the second serving cell being used to generate the first radio signal.

In one embodiment, the first radio signal is transmitted on a serving cell other than the second serving cell, a PhysCellId of the other serving cell being used to generate the first radio signal; the other serving cell is added by the UE in the present disclosure.

In one embodiment, a first parameter is used to generate the first radio signal, and the first parameter is configured by a serving cell added by the UE through zeroCorrelationZoneConfig.

In one embodiment, a first parameter and a second parameter are used to generate the first radio signal, the first parameter being configured by a serving cell added by the UE through zeroCorrelationZoneConfig and the second parameter being configured by a serving cell added by the UE through restrictedSetConfig.

In one embodiment, the specific meaning of the zeroCorrelationZoneConfig can be found in 3GPP TS38.331.

In one embodiment, the specific meaning of the restrictedSetConfig can be found in 3GPP TS38.331.

In one embodiment, the first parameter is a non-negative integer no greater than 15.

In one embodiment, the second parameter is one of an unrestrictedSet, a restrictedSetTypeA or a restrictedSetTypeB.

In one embodiment, the first parameter is configured by the second serving cell.

In one embodiment, the first parameter is configured by a serving cell other than the second serving cell, the other serving cell being added by the UE.

In one embodiment, the second parameter is configured by the second serving cell.

In one embodiment, the second parameter is configured by a serving cell other than the second serving cell, the other serving cell being added by the UE.

Embodiment 17

Figure 17:
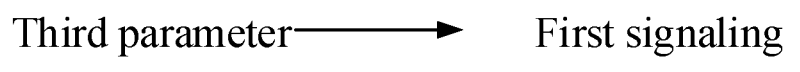

Embodiment 17 illustrates a schematic diagram of generating a first signaling; as shown in FIG. 17.

In Embodiment 17, a third parameter is used to generate the first signaling.

In one embodiment, a third parameter is used to generate at least one of a scrambling sequence or a DMRS for the first signaling, and the third parameter is configured by a serving cell added by the UE through a pdcch-DMRS-ScramblingID.

In one embodiment, the third parameter is a non-negative integer no greater than 65535.

In one embodiment, the specific meaning of the pdcch-DMRS-ScramblingID can be found in 3GPP TS38.331.

In one embodiment, the third parameter is configured by the second serving cell in the present disclosure.

In one embodiment, the third parameter is configured by a serving cell other than the second serving cell, the other serving cell being added by the UE.

In one embodiment, a PhysCellId of the second serving cell is used to generate a scrambling sequence for the first signaling.

In one embodiment, a PhysCellId of the second serving cell is used to generate a DMRS for the first signaling.

In one embodiment, the second base station in the present disclosure transmits the first signaling in at least one of the W time-frequency resource block(s) in the present disclosure, a PhysCellId of the second serving cell being used to generate the first signaling.

In one embodiment, the second base station in the present disclosure transmits the first signaling in at least one of the W time-frequency resource block(s) in the present disclosure, a PhysCellId of the second serving cell being used to generate a scrambling sequence for the first signaling.

In one embodiment, the second base station in the present disclosure transmits the first signaling in at least one of the W time-frequency resource block(s) in the present disclosure, a PhysCellId of the second serving cell being used to generate a DMRS for the first signaling.

Embodiment 18

Figure 18:
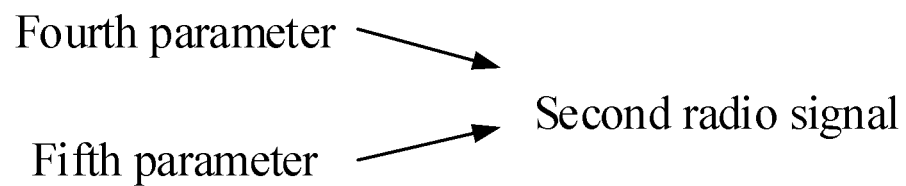
FIG. 18 illustrates a schematic diagram of generating a second radio signal according to one embodiment of the present disclosure.

Embodiment 18 illustrates a schematic diagram of generating a second radio signal; as shown in FIG. 18.

In Embodiment 18, a fourth parameter and a fifth parameter are used to generate the second radio signal.

In one embodiment, a fourth parameter is used to generate a scrambling sequence for the second radio signal, and the fourth parameter is configured by a serving cell added by the UE through a dataScramblingIdentityPDSCH.

In one embodiment, the fourth parameter is a non-negative integer no greater than 1023.

In one embodiment, the fourth parameter is configured by the second serving cell in the present disclosure.

In one embodiment, the fourth parameter is configured by a serving cell other than the second serving cell in the present disclosure, the other serving cell being added by the UE in the present disclosure.

In one embodiment, a fifth parameter is used to generate a DMRS for the second radio signal, and the fifth parameter is configured through a scramblingID0 or a scramblingID1 by a serving cell other than the second serving cell in the present disclosure.

In one embodiment, the fifth parameter is a non-negative integer no greater than 65535.

In one embodiment, the fifth parameter is configured by the second serving cell in the present disclosure.

In one embodiment, the fifth parameter is configured by a serving cell other than the second serving cell in the present disclosure, the other serving cell being added by the UE in the present disclosure.

In one embodiment, a PhysCellId of the second serving cell is used to generate the second radio signal.

In one embodiment, a PhysCellId of the second serving cell is used to generate a scrambling sequence for the second radio signal.

In one embodiment, a PhysCellId of the second serving cell is used to generate a DMRS for the second radio signal.

In one embodiment, a PhysCellId of the second serving cell is used to generate an RS sequence of a DMRS for the second radio signal.

In one embodiment, the second radio signal is transmitted by the second base station in the present disclosure, a PhysCellId of the second serving cell being used to generate the second radio signal.

In one embodiment, the second radio signal is transmitted by the second base station in the present disclosure, a PhysCellId of the second serving cell being used to generate a scrambling sequence for the second radio signal.

In one embodiment, the second radio signal is transmitted by the second base station in the present disclosure, a PhysCellId of the second serving cell being used to generate a DMRS for the second radio signal.

In one embodiment, the fourth parameter is used to generate a scrambling sequence for the third radio signal in the present disclosure.

In one embodiment, the fifth parameter is used to generate a DMRS for the third radio signal in the present disclosure.

In one embodiment, a PhysCellId of the second serving cell is used to generate the third radio signal.

In one embodiment, a PhysCellId of the second serving cell is used to generate a scrambling sequence for the third radio signal.

In one embodiment, a PhysCellId of the second serving cell is used to generate a DMRS for the third radio signal.

In one embodiment, the third radio signal is transmitted by the second base station in the present disclosure, a PhysCellId of the second serving cell being used to generate the third radio signal.

In one embodiment, the third radio signal is transmitted by the second base station in the present disclosure, a PhysCellId of the second serving cell being used to generate a scrambling sequence for the third radio signal.

In one embodiment, the third radio signal is transmitted by the second base station in the present disclosure, a PhysCellId of the second serving cell being used to generate a DMRS for the third radio signal.

Embodiment 19

Figure 19:
FIG. 19 illustrates a schematic diagram of content of a fourth signaling according to one embodiment of the present disclosure.

Embodiment 19 illustrates a schematic diagram of content of a fourth signaling; as shown in FIG. 19.

In Embodiment 19, the first base station in the present disclosure transmits the fourth information via a backhaul link, and the second base station in the present disclosure receives the fourth information via a backhaul link. The fourth information indicates the first time-frequency resource pool in the present disclosure.

In one embodiment, the fourth information comprises a PhysCellId of the second serving cell.

In one embodiment, the fourth information comprises a first index, the first index being used by the second base station for generating the first signaling.

In one embodiment, the first index is used by the second base station for generating a scrambling sequence for the first signaling.

In one embodiment, the first index is used by the second base station for generating a DMRS for the first signaling.

In one embodiment, the first index indicates $n_{ID}$, and the $n_{ID}$ is used by the second base station for determining an initial value of a scrambling sequence generator corresponding to the first signaling, for the specific function of the $n_{ID}$, refer to 3GPP TS38.211, section 7.3.

In one embodiment, the first index indicates $N_{ID}$, and the $N_{ID}$ is used by the second base station for determining an initial value of a DMRS RS sequence generator corresponding to the first signaling, for the specific function of the $N_{ID}$, refer to 3GPP TS38.211, section 7.4.

In one embodiment, the first index is a non-negative integer no greater than 65535.

In one embodiment, the first index is a PhysCellId of the second serving cell.

In one embodiment, the fourth information comprises a fourth index, the fourth index indicates $n_{RNTI}$, and the $n_{RNTI}$ is used by the second base station for determining an initial value of a scrambling sequence generator corresponding to the first signaling, for the specific function of the $n_{RNTI}$, refer to 3GPP TS38.211, section 7.3.

In one embodiment, the fourth information comprises a second index, the second index being used by the second base station for generating the second radio signal.

In one embodiment, the second index indicates $n_{ID}$, and the $n_{ID}$ is used by the second base station for determining an initial value of a scrambling sequence generator corresponding to the second radio signal, for the specific function of the $n_{ID}$, refer to 3GPP TS38.211, section 7.3.

In one embodiment, the second index is a non-negative integer no greater than 1023.

In one embodiment, the second index is a PhysCellId of the second serving cell.

In one embodiment, the fourth information comprises a fourth index, the fourth index indicates $n_{RNTI}$, and the $n_{RNTI}$ is used by the second base station for determining an initial value of a scrambling sequence generator corresponding to the second radio signal, for the specific function of the $n_{RNTI}$, refer to 3GPP TS38.211, section 7.3.

In one embodiment, the fourth information comprises a third index, the third index being used by the second base station for generating a DMRS for the second radio signal.

In one embodiment, the third index indicates a $N_{ID}^0$ or a $N_{ID}^1$, the $N_{ID}^0$ or the $N_{ID}^1$ is used by the second base station for determining an initial value of a DMRS RS sequence generator corresponding to the second radio signal, and for the specific function of the $N_{ID}^0$ or the $N_{ID}^1$, refer to 3GPP TS38.211, section 7.4.

In one embodiment, the third index is a non-negative integer no greater than 65535.

In one embodiment, the third index is a PhysCellId of the second serving cell.

In one embodiment, the fourth information indicates M radio resources, the M radio resources respectively corresponding to the M reference signals in the present disclosure.

In one embodiment, the fourth information indicates M2 radio resource(s), the M2 radio resource(s) respectively corresponding to the M2 reference signal(s) in the present disclosure.

In one embodiment, at least one of the second index, the third index or the fourth index is used by the second base station for generating the third radio signal.

Embodiment 20

Figure 20:
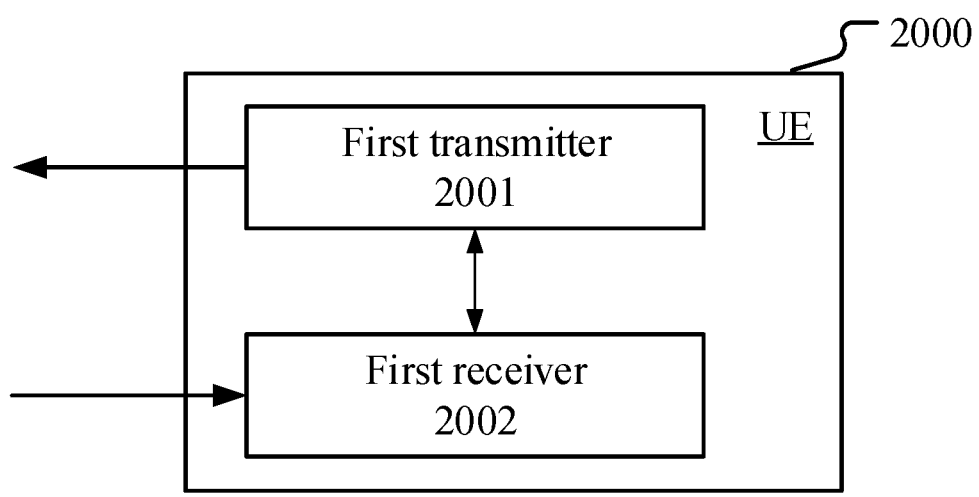
FIG. 20 illustrates a structure block diagram of a processing device in a UE according to one embodiment of the present disclosure.

Embodiment 20 illustrates a structure block diagram of a processing device in a UE; as shown in FIG. 20. In FIG. 20, a processing device 2000 in a UE is composed of a first transmitter 2001 and a first receiver 2002.

In Embodiment 20, a first transmitter 2001 transmits a first radio signal; and a first receiver 2002 monitors a first signaling in each of W time-frequency resource block(s).

In Embodiment 20, the first radio signal indicates a first reference signal out of M reference signals; at least one reference signal of the M reference signals is transmitted by a first serving cell, and the first serving cell is not added by the UE; the UE assumes that a transmission antenna port of the first signaling is Quasi-Co-Located (QCL) with a transmission antenna port of the first reference signal; W is a positive integer, and M is a positive integer greater than 1.

In one embodiment, the first receiver 2002 receives M configuration information blocks via an air interface; herein, the M configuration information blocks respectively indicate the M reference signals; at least one reference signal of the M reference signals is transmitted by a second serving cell, and the second serving cell is added by the UE; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the index of the first serving cell and the index of the second serving cell are respectively composed of Q1 bits and Q2 bits, Q1 and Q2 being different positive integers.

In one embodiment, the first receiver 2002 receives the M reference signals; herein, measurements on the M reference signals are used to determine the first reference signal.

In one embodiment, the first receiver 2002 receives N reference signal(s); herein, measurement(s) on the N reference signal(s) is(are) used to trigger a transmission of the first radio signal; N is a positive integer.

In one embodiment, the first receiver 2002 receives first information on a target serving cell; herein, the first information indicates a first time-frequency resource pool, the first time-frequency resource pool comprising a positive integer number of time-frequency resource block(s), the W time-frequency resource block(s) is(are) a section of the first time-frequency resource pool located in a first time window, the target serving cell being added by the UE.

In one embodiment, the first receiver 2002 receives second information on the first serving cell; herein, the second information indicates M2 reference signal(s) of the M reference signals and an index of the first serving cell, M2 being a positive integer less than M.

In one embodiment, the first receiver 2002 receives a second radio signal; herein, the first signaling comprises scheduling information of the second radio signal; the second radio signal carries a first data block, the first data block being one of K data blocks; K is a positive integer.

In one embodiment, the first transmitter 2001 transmits uplink information; herein, the uplink information is used to determine whether each of the K data blocks is correctly received.

In one embodiment, the first receiver 2002 receives third information; herein, the third information indicates the K.

In one embodiment, the first receiver 2002 receives a third radio signal; herein, the third radio signal carries a second data block, the second data block being one of the K data blocks.

In one embodiment, the first transmitter 2001 comprises at least one of the antenna 452, the transmitter 454, the transmitting processor 468, the multi-antenna transmitting processor 457, the controller/processor 459, the memory 460 or the data source 467 in Embodiment 4.

In one embodiment, the first receiver 2002 comprises at least one of the antenna 452, the receiver 454, the receiving processor 456, the multi-antenna receiving processor 458, the controller/processor 459, the memory 460 or the data source 467 in Embodiment 4.

Embodiment 21

Figure 21:
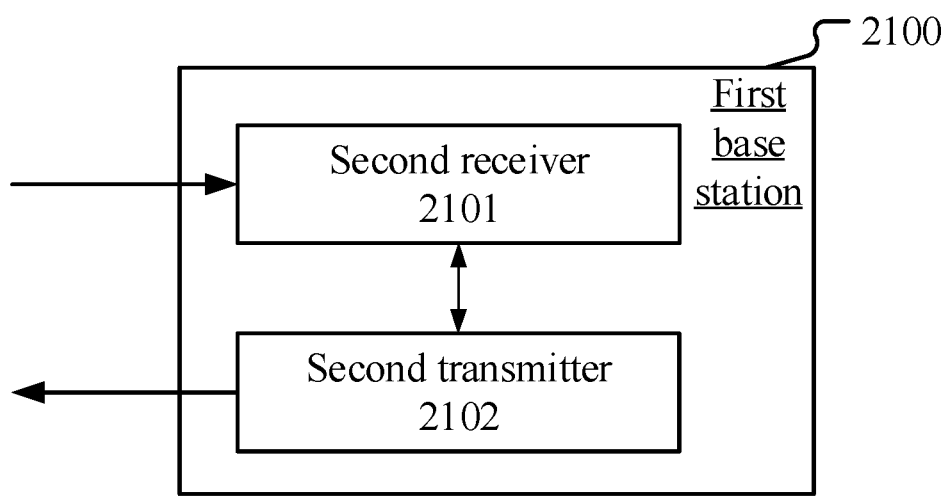
FIG. 21 illustrates a structure block diagram of a processing device in a first base station according to one embodiment of the present disclosure.

Embodiment 21 illustrates a structure block diagram of a processing device in a first base station, as shown in FIG. 21.

In FIG. 21, a processing device 2100 in a first base station is composed of a second receiver 2101 and a second transmitter 2102.

In Embodiment 21, the second receiver 2101 receives a first radio signal, the first radio signal indicating a first reference signal out of M reference signals; and the second transmitter 2102 transmits a first signaling in at least one of W time-frequency resource block(s), wherein the first reference signal is transmitted by a serving cell maintained by the first base station; or, drops transmitting the first signaling in the W time-frequency resource block(s), wherein the first reference signal is not transmitted by any serving cell maintained by the first base station.

In Embodiment 21, at least one reference signal of the M reference signals is transmitted by a first serving cell, the first serving cell not being added by a transmitter of the first radio signal; at least one serving cell maintained by the first base station is added by a transmitter of the first radio signal; the transmitter of the first radio signal assumes that a transmission antenna port of the first signaling is Quasi-Co-Located (QCL) with a transmission antenna port of the first reference signal; W is a positive integer, and M is a positive integer greater than 1.

In one embodiment, the second transmitter 2102 transmits M configuration information blocks via an air interface; herein the M configuration information blocks respectively indicate the M reference signals; at least one reference signal of the M reference signals is transmitted by a second serving cell, and the second serving cell is added by the transmitter of the first radio signal, the first base station being a maintenance base station for the second serving cell; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the index of the first serving cell and the index of the second serving cell are respectively composed of Q1 bits and Q2 bits, Q1 and Q2 being different positive integers.

In one embodiment, the second transmitter 2102 transmits M1 reference signal(s) of the M reference signals; herein, measurement(s) on the M1 reference signal(s) is(are) used to determine the first reference signal, M1 being a positive integer less than M.

In one embodiment, the second transmitter 2102 transmits N reference signal(s); herein, measurement(s) on the N reference signal(s) is(are) used to trigger a transmission of the first radio signal; N being a positive integer.

In one embodiment, the second transmitter 2102 transmits first information on a target serving cell; herein, the first information indicates a first time-frequency resource pool, the first time-frequency resource pool comprising a positive integer number of time-frequency resource block(s), the W time-frequency resource block(s) is(are) a section of the first time-frequency resource pool located in a first time window, the target serving cell being added by the UE.

In one embodiment, the second receiver 2101 receives uplink information; herein, the first signaling comprises scheduling information of a second radio signal, and the second radio signal carries a first data block, the first data block being one of K data blocks; the uplink information is used to determine whether each of the K data blocks is correctly received.

In one embodiment, the second transmitter 2102 transmits third information; herein, the third information indicates the K.

In one embodiment, the second transmitter 2102 transmits a second radio signal; herein, the first base station transmits the first signaling in at least one time-frequency resource block of the W time-frequency resource block(s), and the first signaling comprises scheduling information of the second radio signal; the second radio signal carries a first data block, the first data block being one of K data blocks; K being a positive integer.

In one embodiment, the second transmitter 2102 transmits a third radio signal; herein, the third radio signal carries a second data block, the second data block being one of the K data blocks; a time resource occupied by the third radio signal is earlier than a time resource occupied by the second radio signal, and an index of the second data block among the K data blocks is smaller than an index of the first data block among the K data blocks.

In one embodiment, the second transmitter 2102 transmits fourth information via a backhaul link; herein, the fourth information indicates a first time-frequency resource pool, the first time-frequency resource pool comprising a positive integer number of time-frequency resource block(s), and the W time-frequency resource block(s) is(are) a section of the first time-frequency resource pool located in a first time window.

In one embodiment, the second receiver 2101 comprises at least one of the antenna 420, the receiver 418, the receiving processor 470, the multi-antenna receiving processor 472, the controller/processor 475 or the memory 476 in Embodiment 4.

In one embodiment, the second transmitter 2102 comprises at least one of the antenna 420, the transmitter 418, the transmitting processor 416, the multi-antenna transmitting processor 471, the controller/processor 475 or the memory 476 in Embodiment 4.

Embodiment 22

Figure 22:
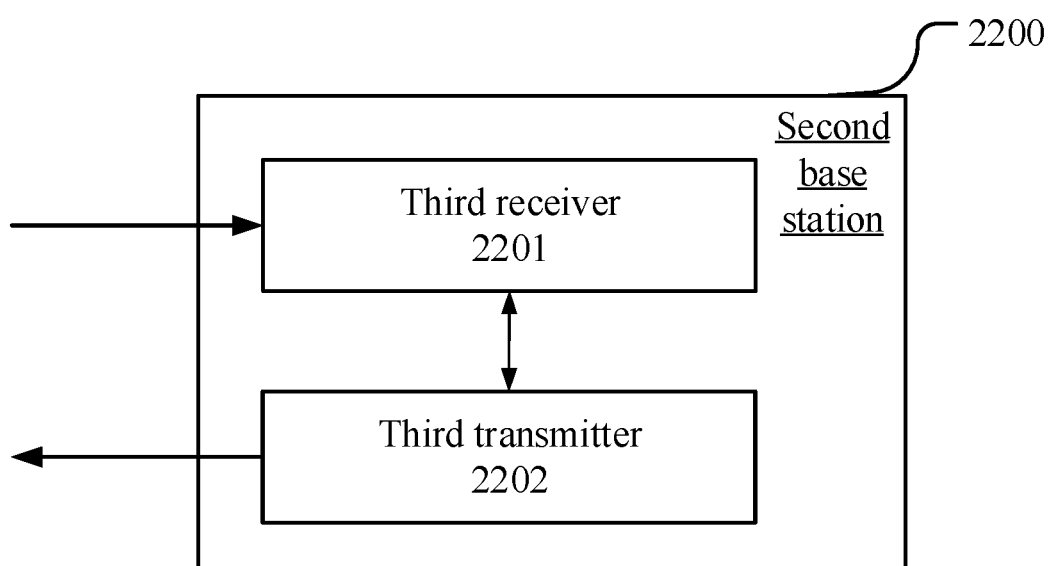
FIG. 22 illustrates a structure block diagram of a processing device in a second base station according to one embodiment of the present disclosure.

Embodiment 22 illustrates a structure block diagram of a processing device in a second base station, as shown in FIG. 22. In FIG. 22, a processing device 2200 in a second base station is composed of a third receiver 2201 and a third transmitter 2202.

In Embodiment 22, a third receiver 2201 receives a first radio signal, the first radio signal indicating a first reference signal out of M reference signals; and the third transmitter 2202 transmits a first signaling in at least one of W time-frequency resource block(s), wherein the first reference signal is transmitted by a serving cell maintained by the second base station; or, drops transmitting the first signaling in the W time-frequency resource block(s), wherein the first reference signal is not transmitted by any serving cell maintained by the second base station.

In one embodiment, the third transmitter 2202 transmits M2 reference signal(s) of the M reference signals; herein, measurement(s) on the M2 reference signal(s) is(are) used to determine the first reference signal, M2 being a positive integer less than M.

In one embodiment, the third transmitter 2202 transmits second information on the first serving cell; herein, the second information indicates M2 reference signal(s) of the M reference signals, M2 being a positive integer less than M.

In one embodiment, the third transmitter 2202 transmits a second radio signal; herein, the second base station transmits the first signaling in at least one time-frequency resource block of the W time-frequency resource block(s), the first signaling comprises scheduling information of the second radio signal, and the second radio signal carries a first data block, the first data block being one of K data blocks; K being a positive integer.

In one embodiment, the third transmitter 2202 transmits a third radio signal; herein, the third radio signal carries a second data block, the second data block being one of the K data blocks; a time resource occupied by the third radio signal is earlier than a time resource occupied by the second radio signal, and an index of the second data block among the K data blocks is larger than an index of the first data block among the K data blocks.

In one embodiment, the third receiver 2201 receives fourth information via a backhaul link; herein, the fourth information indicates a first time-frequency resource pool, the first time-frequency resource pool comprising a positive integer number of time-frequency resource block(s), and the W time-frequency resource block(s) is(are) a section of the first time-frequency resource pool located in a first time window.

In one embodiment, the third receiver 2201 comprises at least one of the antenna 420, the receiver 418, the receiving processor 470, the multi-antenna receiving processor 472, the controller/processor 475 or the memory 476 in Embodiment 4.

In one embodiment, the third transmitter 2202 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for NR, comprising:
    transmitting a first radio signal, the first radio signal indicating a first reference signal out of M reference signals; and
    monitoring a first signaling in each time-frequency resource block of W time-frequency resource block(s);
    wherein any of the M reference signals is a CSI-RS or an SS/PBCH block; at least one reference signal of the M reference signals is transmitted by a first serving cell, and the first serving cell is not added by the UE; the UE assumes that a transmission antenna port of the first signaling is Quasi-Co-Located with a transmission antenna port of the first reference signal; W is a positive integer, and M is a positive integer greater than 1; the meaning of the phrase that the first serving cell is not added by the UE includes that the UE is not assigned an SCellIndex nor a ServCellIndex for the first serving cell; the first serving cell is not a PCell of the UE; the first signaling comprises DCI and the first signaling is transmitted on a PDCCH; CRC of the first signaling is scrambled by a C-RNTI.

2. The method according to claim 1,
    wherein at least one reference signal of the M reference signals is transmitted by a second serving cell, and the second serving cell is added by the UE; the meaning of the phrase that the second serving cell is added by the UE includes that the UE is assigned an SCellIndex or a ServCellIndex for the second serving cell; any of the M reference signals is transmitted by either the first serving cell or the second serving cell.

3. The method according to claim 2, comprising at least one of:
    receiving M configuration information blocks via an air interface; or
    receiving first information on a target serving cell;
    wherein the M configuration information blocks respectively indicate the M reference signals; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the first information indicates a first time-frequency resource pool, the first time-frequency resource pool is a CORESET or a search space; the first time-frequency resource pool comprising a positive integer number of time-frequency resource block(s), the W time-frequency resource block(s) belongs(belong) to a section of the first time-frequency resource pool that is located in a first time window, and the target serving cell is added by the UE; the meaning of the phrase that the target serving cell is added by the UE includes that the UE is assigned an SCellIndex or a ServCellIndex for the target serving cell.

4. The method according to claim 3, wherein the index of the first serving cell and the index of the second serving cell are respectively composed of Q1 bits and Q2 bits, Q1 and Q2 being different positive integers.

5. The method according to claim 1, comprising at least one of:
    receiving the M reference signals; or
    receiving N reference signal(s), N being a positive integer;

wherein measurements on the M reference signals are used to determine the first reference signal, while measurement(s) on the N reference signal(s) is(are) used to trigger a transmission of the first radio signal.

6. The method according to claim 1, wherein the first serving cell is maintained by a TRP.

7. A UE for NR, comprising:
a first transmitter, which transmits a first radio signal, the first radio signal indicating a first reference signal out of M reference signals; and
a first receiver, which monitors a first signaling in each time-frequency resource block of W time-frequency resource block(s);
wherein any of the M reference signals is a CSI-RS or an SS/PBCH block; at least one reference signal of the M reference signals is transmitted by a first serving cell, and the first serving cell is not added by the UE; the UE assumes that a transmission antenna port of the first signaling is Quasi-Co-Located with a transmission antenna port of the first reference signal; W is a positive integer, and M is a positive integer greater than 1; the meaning of the phrase that the first serving cell is not added by the UE includes that the UE is not assigned an SCellIndex nor a ServCellIndex for the first serving cell; the first serving cell is not a PCell of the UE; the first signaling comprises DCI and the first signaling is transmitted on a PDCCH; CRC of the first signaling is scrambled by a C-RNTI.

8. The UE according to claim 7, wherein
at least one reference signal of the M reference signals is transmitted by a second serving cell, and the second serving cell is added by the UE; the meaning of the phrase that the second serving cell is added by the UE includes that the UE is assigned an SCellIndex or a ServCellIndex for the second serving cell; any of the M reference signals is transmitted by either the first serving cell or the second serving cell.

9. The UE according to claim 8, wherein the first receiver performs at least one of:
receiving M configuration information blocks via an air interface; or
receiving first information on a target serving cell;
wherein the M configuration information blocks respectively indicate the M reference signals; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the first information indicates a first time-frequency resource pool, the first time-frequency resource pool is a CORESET or a search space; the first time-frequency resource pool comprising a positive integer number of time-frequency resource block(s), the W time-frequency resource block(s) belongs(belong) to a section of the first time-frequency resource pool that is located in a first time window, and the target serving cell is added by the UE; the meaning of the phrase that the target serving cell is added by the UE includes that the UE is assigned an SCellIndex or a ServCellIndex for the target serving cell.

10. The UE according to claim 9, wherein the index of the first serving cell and the index of the second serving cell are respectively composed of Q1 bits and Q2 bits, Q1 and Q2 being different positive integers.

11. The UE according to claim 7, wherein the first receiver performs at least one of:
receiving the M reference signals; and
receiving N reference signal(s), N being a positive integer;
wherein measurements on the M reference signals are used to determine the first reference signal, while measurement(s) on the N reference signal(s) is(are) used to trigger a transmission of the first radio signal.

12. The UE according to claim 7, wherein the first serving cell is maintained by a TRP.

13. A first base station for NR, comprising:
a second receiver, which receives a first radio signal, the first radio signal indicating a first reference signal out of M reference signals; and
a second transmitter, which transmits a first signaling in at least one time-frequency resource block of W time-frequency resource block(s), wherein the first reference signal is transmitted by a serving cell maintained by the first base station; or, which drops transmitting the first signaling in the W time-frequency resource block(s), wherein the first reference signal is not transmitted by any serving cell maintained by the first base station;
wherein any of the M reference signals is a CSI-RS or an SS/PBCH block; at least one reference signal of the M reference signals is transmitted by a first serving cell, the first serving cell not being added by a transmitter of the first radio signal; at least one serving cell maintained by the first base station is added by the transmitter of the first radio signal; the transmitter of the first radio signal assumes that a transmission antenna port of the first signaling is Quasi-Co-Located with a transmission antenna port of the first reference signal; W is a positive integer, and M is a positive integer greater than 1; the meaning of the phrase that the first serving cell not being added by a transmitter of the first radio signal includes that the transmitter of the first radio signal is not assigned an SCellIndex nor a ServCellIndex for the first serving cell; the first serving cell is not a PCell of the transmitter of the first radio signal; the meaning of the phrase that at least one serving cell maintained by the first base station is added by the transmitter of the first radio signal includes that the transmitter of the first radio signal is assigned an SCellIndex or a ServCellIndex for the at least one serving cell maintained by the first base station; the first signaling comprises DCI and the first signaling is transmitted on a PDCCH; CRC of the first signaling is scrambled by a C-RNTI; the first base station is a TRP.

14. The first base station according to claim 13, wherein at least one reference signal of the M reference signals is transmitted by a second serving cell, and the second serving cell is added by the transmitter of the first radio signal, the first base station being a maintenance TRP for the second serving cell; the meaning of the phrase that the second serving cell is added by the transmitter of the first radio signal includes that the transmitter of the first radio signal is assigned an SCellIndex or a ServCellIndex for the second serving cell; any of the M reference signals is transmitted by either the first serving cell or the second serving cell;
or, the first serving cell is maintained by a TRP;
or, the first serving cell is maintained by a TRP, at least one reference signal of the M reference signals is transmitted by a second serving cell, and the second serving cell is added by the transmitter of the first radio signal, the first base station being a maintenance TRP for the second serving cell; the meaning of the phrase that the second serving cell is added by the transmitter of the first radio signal includes that the transmitter of the first radio signal is assigned an SCellIndex or a ServCellIndex for the second serving cell; any of the M reference signals is transmitted by either the first serving cell or the second serving cell.

15. The first base station according to claim 14, wherein the second transmitter performs at least one of:
  transmitting M configuration information blocks via an air interface; and
  transmitting first information on a target serving cell;
  wherein the M configuration information blocks respectively indicate the M reference signals; of the M configuration information blocks each configuration information block corresponding to a reference signal transmitted by the first serving cell comprises an index of the first serving cell; of the M configuration information blocks each configuration information block corresponding to a reference signal transmitted by the second serving cell comprises an index of the second serving cell; the first information indicates a first time-frequency resource pool, the first time-frequency resource pool is a CORESET or a search space; the first time-frequency resource pool comprising a positive integer number of time-frequency resource block(s), the W time-frequency resource block(s) belongs(belong) to a section of the first time-frequency resource pool that is located in a first time window, and the target serving cell is added by the transmitter of the first radio signal; the meaning of the phrase that the target serving cell is added by the transmitter of the first radio signal includes that the transmitter of the first radio signal is assigned an SCellIndex or a ServCellIndex for the target serving cell.

16. The first base station according to claim 15, wherein the index of the first serving cell and the index of the second serving cell are respectively composed of Q1 bits and Q2 bits, Q1 and Q2 being different positive integers.

17. The first base station according to claim 13, wherein the second transmitter performs at least one of:
  transmitting M1 reference signal(s) of the M reference signals, wherein measurement(s) on the M1 reference signal(s) is(are) used to determine the first reference signal, M1 being a positive integer less than M; and
  transmitting N reference signal(s), wherein measurement(s) on the N reference signal(s) is(are) used to trigger a transmission of the first radio signal, N being a positive integer.

18. A second base station for NR, comprising:
  a third receiver, which receives a first radio signal, the first radio signal indicating a first reference signal out of M reference signals; and
  a third transmitter, which transmits a first signaling in at least one time-frequency resource block of W time-frequency resource block(s), wherein the first reference signal is transmitted by a serving cell maintained by the second base station; or, which drops transmitting the first signaling in the W time-frequency resource block(s), wherein the first reference signal is not transmitted by any serving cell maintained by the second base station;
  wherein any of the M reference signals is a CSI-RS or an SS/PBCH block; the second base station is a TRP, and the second base station is a maintenance TRP for a first serving cell, at least one reference signal of the M reference signals is transmitted by the first serving cell, none of serving cells maintained by the second base station being added by a transmitter of the first radio signal; the transmitter of the first radio signal assumes that a transmission antenna port of the first signaling is Quasi-Co-Located with a transmission antenna port of the first reference signal; W is a positive integer, and M is a positive integer greater than 1; the meaning of the phrase that none of serving cells maintained by the second base station being added by a transmitter of the first radio signal includes that the transmitter of the first radio signal is assigned an SCellIndex or a ServCellIndex for none of the serving cells maintained by the second base station; the first serving cell is not a PCell of the transmitter of the first radio signal; the first signaling comprises DCI and the first signaling is transmitted on a PDCCH; CRC of the first signaling is scrambled by a C-RNTI.

19. The second base station according to claim 18, wherein
  at least one reference signal of the M reference signals is transmitted by a second serving cell, and the second serving cell is added by the transmitter of the first radio signal; the meaning of the phrase that the second serving cell is added by the transmitter of the first radio signal includes that the transmitter of the first radio signal is assigned an SCellIndex or a ServCellIndex for the second serving cell; any of the M reference signals is transmitted by either the first serving cell or the second serving cell.

20. The second base station according to claim 18, wherein the third transmitter performs at least one of:
  transmitting M2 reference signal(s) of the M reference signals, wherein measurement(s) on the M2 reference signal(s) is(are) used to determine the first reference signal, M2 being a positive integer less than M; or
  transmitting second information on the first serving cell; wherein the second information indicates M2 reference signal(s) of the M reference signals, M2 being a positive integer less than M.

* * * * *